United States Patent
García Pérez et al.

(10) Patent No.: US 9,328,199 B2
(45) Date of Patent: May 3, 2016

(54) CROSS-LINKED ARAMID

(71) Applicant: Universidad de Burgos, Burgos (ES)

(72) Inventors: José Miguel García Pérez, Burgos (ES); Félix Clemente García García, Burgos (ES); Felipe Serna Arenas, Burgos (ES); José Luis De La Peña Albillos, Burgos (ES); Miriam Trigo López, Burgos (ES); Pedro Antonio Tévez Bolívar, Burgos (ES); Saúl Vallejos Calzada, Burgos (ES); Ramón Ferrer Rullán, Reus (ES)

(73) Assignee: Universidad De Burgos, Burgos (ES)

( * ) Notice: Subject to any disclaimer, the term of this patent is extended or adjusted under 35 U.S.C. 154(b) by 0 days.

(21) Appl. No.: 14/410,017

(22) PCT Filed: Jun. 20, 2013

(86) PCT No.: PCT/EP2013/062824
§ 371 (c)(1),
(2) Date: Dec. 19, 2014

(87) PCT Pub. No.: WO2013/190023
PCT Pub. Date: Dec. 27, 2013

(65) Prior Publication Data
US 2015/0191570 A1    Jul. 9, 2015

(30) Foreign Application Priority Data

Jun. 21, 2012 (EP) .................................... 12382246

(51) Int. Cl.
*C08G 75/02*   (2006.01)
*C08G 69/48*   (2006.01)
*C08G 69/26*   (2006.01)
*C08G 69/32*   (2006.01)
*C09D 177/06*  (2006.01)
*C08C 2/04*    (2006.01)

(52) U.S. Cl.
CPC ............... *C08G 69/48* (2013.01); *C08G 69/26* (2013.01); *C08G 69/32* (2013.01); *C09D 177/06* (2013.01)

(58) Field of Classification Search
CPC .................................. C08F 8/50; C08F 10/00
USPC .................... 524/606; 525/310, 420; 528/481
See application file for complete search history.

(56) References Cited

FOREIGN PATENT DOCUMENTS

| WO | WO 2008/028605 | 3/2008 |
|----|----------------|--------|
| WO | WO 2009/130244 | 10/2009 |

OTHER PUBLICATIONS

Garcia et al., "High-performance aromatic polyamides", Progress in Polymer Science, 35, pp. 623-686 (2010).
Yang et al., "Aramid Fibers" in "Handbook of Fiber Chemistry", Ch. 13, pp. 985-1000, M. Lewin Ed., Boca Ratón (2007).
Van Krevelen et al., "Properties of Polymers. Their correlation with chemical structure; their numerical estimation and prediction from additive group contributions", Elsevier, Amsterdam, 4rd edn., pp. 855-857 (2009).

*Primary Examiner* — Terressa Boykin
(74) *Attorney, Agent, or Firm* — Squire Patton Boggs (US) LLP

(57) ABSTRACT

The invention encompasses the process for the preparation of a cross-linked aramid polymer comprising the step of heating a non-crosslinked polymer comprising the repeating unit of formula (I) at a temperature comprised of from 150 to 400° C. for a period of time comprised of from 1 second to 20 minutes, wherein A and B are independently selected from meta-phenylene and para-phenylene, and R1 and R2 are independently selected from H and $N_3$, with the proviso that at least one of R1 and R2 is $N_3$ and R1 and R2 are attached to any of the positions 1, 2, 3, or 4 in para-phenylene and 1, 2, 3 in meta-phenylene; and the obtained cross-linked aramid polymer.

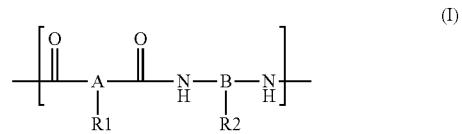

20 Claims, 7 Drawing Sheets

HP tt-HP

CP1 tt-CP1

CROSS-LINKED ARAMID

The present invention is related to the fields of chemistry and material science. More particularly, the present invention refers to new cross-linked aromatic polyamide polymers.

BACKGROUND ART

Aromatic polyamides, also known as aramid polymers or aramids, are well-known in macromolecular and material sciences for their outstanding thermal and mechanical properties. Their properties have been attributed to their amide linkages, shared with conventional aliphatic polyamides, their highly aromatic structure, and the interactions between the polymer chains via highly directional hydrogen bonds.

Commercial aramids as poly(p-phenylene terephtalamide) (PPPT, p-aramid, Kevlar®, Twaron®) and poly(m-phenylene isophthalamide) (PMPI, Nomex®, Teijinconex®) have been available for decades and have been found to be useful in a wide range of high-performance applications.

Known aramid polymers can be processed into flame-resistant, cut-resistant, and high tensile strength synthetic materials, with advanced technological applications in almost all industrial fields.

Recent contributions in the art involve incorporating new chemical functionalities in the polyamide backbone or lateral structure of aramids in order to provide key properties for the expansion of the technological applications of aramids.

WO2008028605A2 describes cross-linked aramid polymers wherein the aramid backbone has been functionalized with arylene carboxylic acid and hydroxyl groups, optionally with an additional cross-linker agent. This document describes the process to cross-link the aramid polymers obtained by thermal treatment forming an ester linkage between the polymer chains, optionally through the addition of a cross-linker agent. WO2008028605A2 is silent about the electric, thermal, mechanical, stability and processing properties of the disclosed cross-linked polymer.

WO2009130244A2 describes aramid polymers which are cross-linked through the amide moiety in the aramid backbone via poly(meth)acrylic acid (PAA) as a cross-linker agent. However, the provided data only shows a slight improvement of the compressive properties of the aramid cross-linked via PAA and remains silent about electric, stability, and other key thermal and mechanical properties as Young's Module and tensile strength.

From what it is known in the art it is derived that there is still the need of finding new aramids with good properties, or combination of properties, to suit the technological needs of the industry, while featuring simple and scalable preparation processes and ease of transformation.

SUMMARY OF THE INVENTION

The new cross-linked aramid polymers of the invention have shown improved properties, in particular, electrical insulation, thermal, stability, and/or mechanical properties while maintaining ease of processing. Further, the properties shown by the new cross-linked aramids of the invention render the product especially suitable for advanced technological applications.

Thus, according to a first aspect, the present invention relates to a process for the preparation of a cross-linked aramid polymer comprising the step of heating a non-crosslinked polymer comprising the repeating unit of formula (I) at a temperature comprised of from 150 to 400° C. for a period of time comprised of from 1 second to 20 minutes,

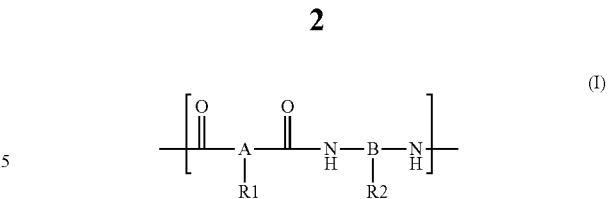

wherein A and B are independently selected from meta-phenylene and para-phenylene,

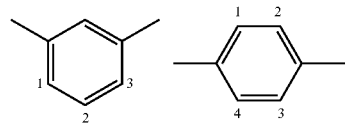

and R1 and R2 are independently selected from H and $N_3$, with the proviso that at least one of R1 and R2 is $N_3$, and R1 and R2 are attached to any of the positions 1, 2, 3, or 4 in para-phenylene and 1, 2, 3 in meta-phenylene.

The inventors have found that the heating step of the non-crosslinked polymers comprising the repeating unit of formula (I) at a temperature from 150 to 400° C. yields the cross-linking of the polymeric materials of the invention and gives rise to improved mechanical and thermal properties, while maintaining ease of processing. In particular, the cross-linked polymers of the invention have shown advantageous Young's Modulus and Tensile Strength when compared with non-crosslinked aramids.

Thus, another aspect of the invention relates to a cross-linked aramid polymer, obtainable by a preparation process comprising the step of heating the polymer containing the repeating unit of formula (I) as defined above.

Further, as a third aspect of the invention, a polymer made of the repeating unit of formula (I) as defined above is provided.

As a fourth aspect, the invention provides a non-crosslinked polymer comprising a repeating unit of formula (I) as defined above.

As mentioned, the cross-linked aramid polymers obtainable by the process of the first aspect of the invention are specially suitable for advanced technological applications due to their electrical, thermal, stability, and mechanical properties and/or the combination of their properties. Thus, in a fifth aspect, the invention provides the use of a cross-linked aramid polymer obtainable by the process of the first aspect of the invention in an application selected from filtration; heat or electric insulation; and flame or impact protection.

Finally, as a sixth aspect, the invention provides a composite material comprising a cross-linked aramid polymer as defined above.

DETAILED DESCRIPTION OF THE INVENTION

Figure 1:
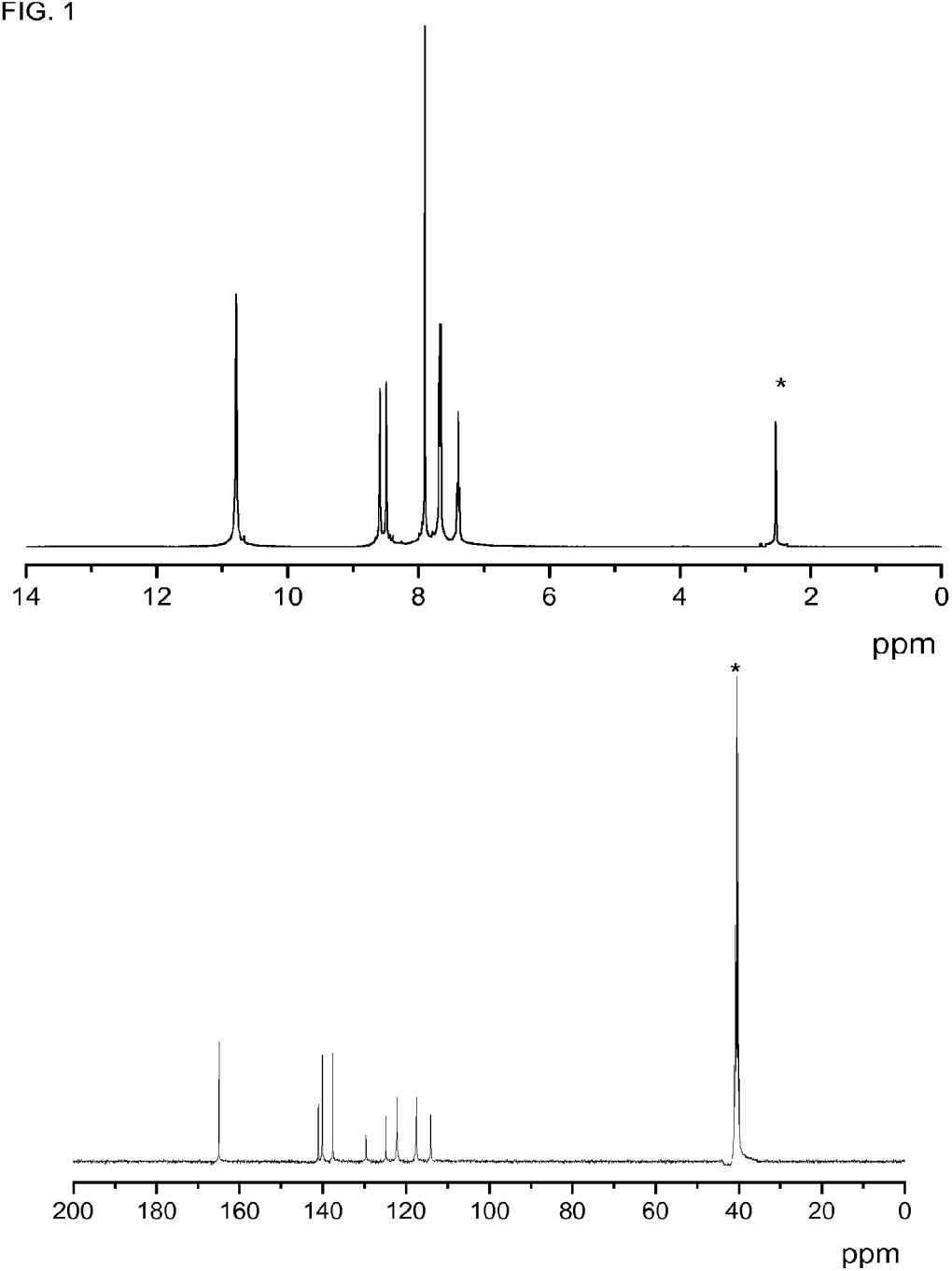
FIG. 1 $^1$H and $^{13}$C NMR data of non-crosslinked homopolymer poly(m-phenylene 5-azideisophthalamide) (HP). Solvent (DMSO-$d_6$) signal is marked as *.

For the purposes of the invention, any ranges given include both the lower and the upper end-points of the range.

Ranges given, such as temperatures, times, percentages, and the like, should be considered approximate, unless specifically stated.

As mentioned above, an aspect of the present invention is the provision of a process for the preparation of a cross-linked aramid polymer by thermal treatment of a non-crosslinked polymer comprising the repeating unit of formula (I) at a temperature comprised of from 150 to 400° C. for a period of time comprised of from 1 second to 20 minutes.

The terms aramid or aromatic polyamide, as used herein, refer to a polyamide polymer wherein at least an 80% of the repeating units include an aromatic moiety. Preferably, at least 85% of amide groups are bound directly to two aromatic rings.

According to the present invention a cross-linked polymer is a polymer in which different chains are attached to each other by means of covalent bonds, forming a three dimensional network where the molecular weight approaches infinity.

Given that the structure of the final cross-linked polymers is unknown because of the random formation of the cross-link bonds between the polymeric chains, proof of the transformation can be settled by the monitorization of the disappearance of the free azide groups, for example by IR, the changes in the mechanical and thermal properties, and the complete insolubility of the cross-linked materials.

As used in the present invention, the terms "repeating unit" and "repeat unit" refer to the structural repeating moieties, or structural units, of a polymer chain whose repetition would produce the complete polymer by linking the repeating units together along the chain.

The thermal treatment of the non-crosslinked polymers comprising the repeating unit of formula (I) as described above at a temperature comprised of from 150 to 400° C. for a period of time comprised of 1 second to 20 minutes gives rise to the cross-linking of the polymer material subjected to that treatment, improving its thermal and mechanical properties.

In a particular embodiment, the temperature of the heating step is comprised of from 150 to 280° C., more particularly 240° C.

In a preferred embodiment, the non-crosslinked aramid polymer is in the form of a film, a membrane, an enamel, or a coating, and the heating step is carried out at a temperature comprised of from 150 to 280° C. for a period of time of from 1 minute to 15 minutes, more preferably 10 minutes.

In an alternative preferred embodiment, the non-crosslinked aramid polymer is in the form of a fiber or a filament, and the heating step is carried out at a temperature comprised of from 150 to 280° C. for a period of time of from 1 second to 15 seconds, more preferably 3 seconds.

In a particular embodiment of the invention, the process is carried out under inert atmosphere, for example under nitrogen.

The cross-linking of the polymer comprising the repeating unit of formula (I) can be evaluated by the evolution of its thermal and mechanical properties, for example with reference to a non cross-linked polymer to validate the increase in the properties.

Cross-linking can also be monitored through, for example, the disappearance of the azide group detected by Fourier transform infrared spectroscopy (IR-FT). Thus, the characteristic absorption band of the azide group disappears after thermal treatment. Furthermore, it can also be verified by means of the solubility evolution, polymers are soluble in different solvents, and cross-linked materials are completely insoluble, even in sulphuric acid.

Particular and preferred embodiments disclosed herein below are referred to the process of the invention and define particular and preferred features of the non-crosslinked polymer comprising the repeating unit of formula (I) and the cross-linking process. It is noted that, provided that the structure of the repeating units defines the structure of the non-crosslinked starting polymer and, at least in some extent, the structure of the resulting cross-linked aramid polymer, such particular and preferred embodiments are also particular and preferred embodiments of the aspects of the invention referring to the repeating units, the polymer made of said repeating units, the non-crosslinked polymer, and the cross-linked aramid polymer. Furthermore, the present invention covers all possible combinations of particular and preferred groups described herein.

In a particular embodiment of the invention, in the repeating unit of formula (I) each of A and B are different. In a more particular embodiment, A is meta-phenylene and B is para-phenylene, or alternatively, A is para-phenylene and B is meta-phenylene; and R1 and R2 are as defined above.

In another particular embodiment of the invention, both A and B are meta-phenylene or para-phenylene, where R1 and R2 are as defined above. In a preferred embodiment of the invention, both A and B are meta-phenylene, where R1 and R2 are as defined above. In an alternative preferred embodiment of the invention, both A and B are para-phenylene, where R1 and R2 are as defined above.

In all the embodiments of the present invention, at least one of the phenylene rings on the repeating unit of formula (I) is substituted by an azide group in any of the positions 1, 2, 3, or 4 in para-phenylene and 1, 2, 3 in meta-phenylene. The positions of the para-phenylene or the meta-phenylene not substituted with the groups R1 or R2 are substituted with H.

In a particular embodiment of the invention, meta-phenylene is substituted by an azide in position 2. In another particular embodiment of the invention, para-phenylene is substituted by an azide in position 2 or 3.

In a particular embodiment of the invention, R1 and R2 are both azide groups. In other particular embodiments of the invention, R1 and R2 are both azide groups and A and B are as defined in any of the embodiments above. More particularly, A is meta-phenylene and R1 is an azide attached in position 2.

In a preferred embodiment of the invention, one of R1 and R2 is azide and the other is hydrogen, more preferably R1 is azide. In an alternative particular embodiment, R2 is azide. In other particular embodiments of the invention, one of R1 and R2 is azide and the other is hydrogen and A and B are as defined in any of the embodiments above.

In the most preferred embodiment of the invention, the repeating unit of formula (I) is selected from the group consisting of a repeating unit of formula (Ia) and (Ib) and (Ic).

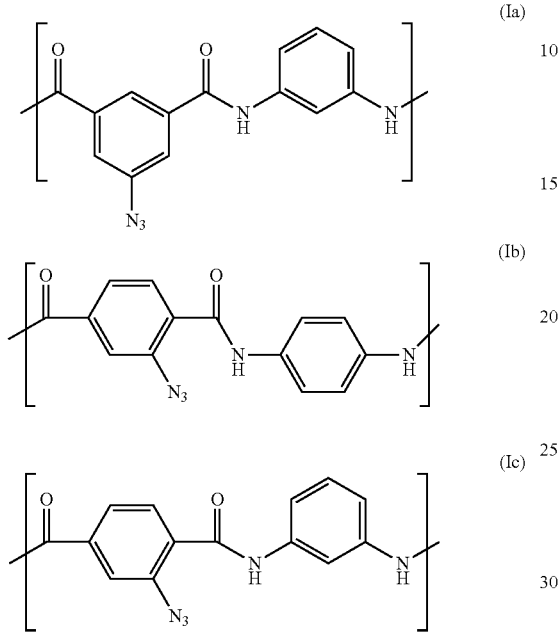

In the present invention, the term "polymer comprising the repeating unit of formula (I)" can be a homopolymer or a copolymer comprising at least one type of repeating unit of formula (I).

In a preferred embodiment of the invention, the non-crosslinked polymer comprising the repeating unit of formula (I) is a homopolymer i.e. a polymer containing only a single type of repeating unit. In particular embodiments of the invention, the homopolymer consists in repeating units of formula (I), wherein A, B, R1 and R2 are as defined in any of the embodiments described above for the repeating unit of formula (I). In a particular embodiment of the invention, the homopolymer consists in repeating units of formula (Ia).

In a particular embodiment of the invention, the non-crosslinked polymer comprising the repeating unit of formula (I) is a copolymer. As used in the present invention, a copolymer is a polymer containing at least two different types of repeating units, for instance at least a repeating unit of formula (I) and any other suitable repeating unit, or two or more different repeating units of formula (I).

In a preferred embodiment of the invention, the copolymers of the invention are random copolymers, i.e. a copolymer wherein the probability of finding a given type monomer residue at a particular point in the chain is equal to the mole fraction of that monomer residue in the chain.

Suitable repeating units are those which are obtainable by reaction between known diacyl monomer and diamine monomers. In a particular embodiment, the suitable diacyl and diamine monomers are aromatic. In a more particular embodiment, the diamine monomer is selected from those on Scheme 1.

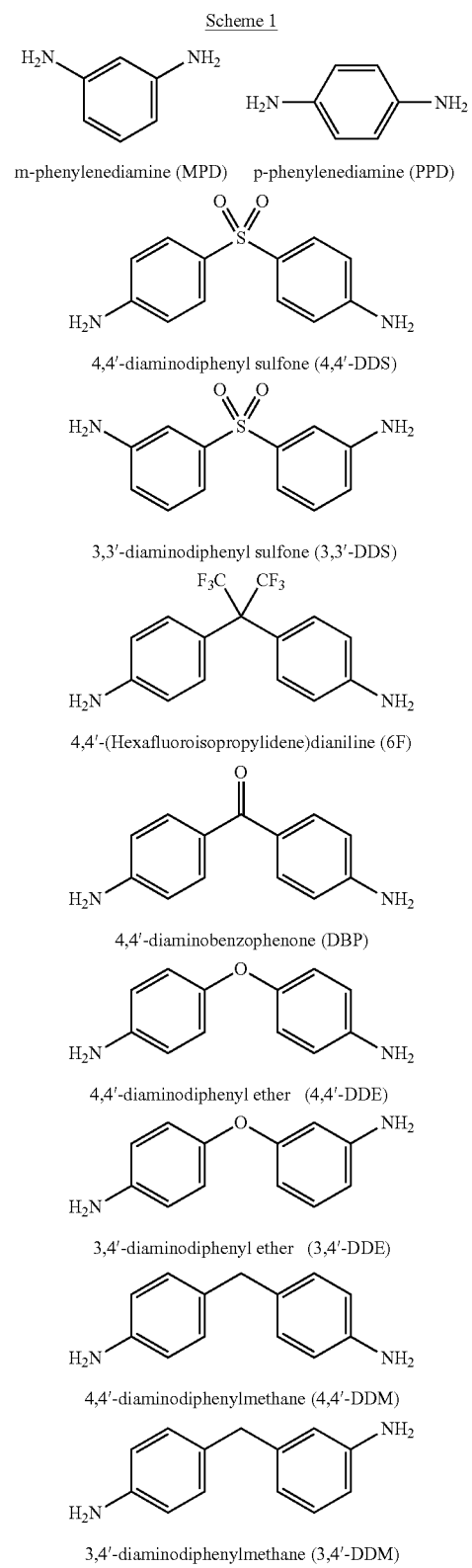

In a more particular embodiment the diacyl monomer is selected from those on Scheme 2.

Scheme 2

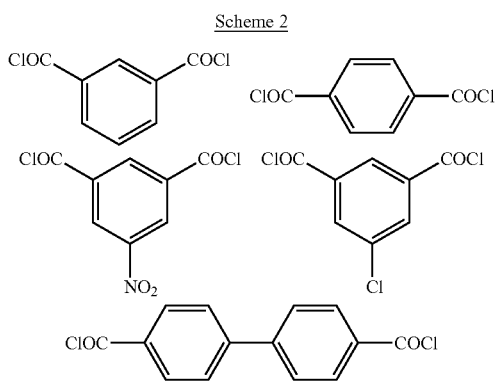

In a preferred embodiment of the invention, the non-crosslinked polymer comprising the repeating unit of formula (I) is a copolymer which further comprises the repeating unit of formula (II)

$$\left[ \begin{array}{c} O \\ \| \\ C \end{array} - A - \begin{array}{c} O \\ \| \\ C \end{array} - \underset{H}{N} - B - \underset{H}{N} \right] \quad (II)$$

wherein A and B are as defined in any of the embodiments above of the first aspect of the invention. In particular embodiments of the invention, the copolymer comprises repeating units of formula (I), and repeating units of formula (II), wherein A, B, R1 and R2 are as defined in any of the embodiments described above for the repeating unit of formula (I). More particularly, the copolymer consist of repeating units of formula (I), and repeating unit of formula (II) as described above.

The copolymers of the present invention comprise repeating units of formula (I) in any proportion. In particular, the copolymer comprises at least 0.01, 0.1, 1, 5, 10, 20, 30, 40, 50, 60, 70, 90, or 99 mol % of the repeating unit of formula (I) being the sum of the mol % of the repeating units of the copolymer 100%. In a more particular embodiment, the copolymer comprises less than 50 mol % of the repeating unit of formula (I), more particularly less than 10 mol % and even more particularly from 0.01 to 0.1 mol %.

In a preferred embodiment of the invention, the copolymer comprises from 0.01 to 10 mol % of the repeating unit of formula (I) defined above and from 99.99 to 90 mol % of the repeating unit of formula (II), being the sum of the mol % of the repeating units of the copolymer 100%. In particular, the copolymer comprises from 0.01 to 0.1 mol % of the repeating unit of formula (I) defined above. In an alternative particular embodiment, the copolymer comprises from 1 to 10 mol % of the repeating unit of formula (I) defined above.

In a particular embodiment of the invention, the copolymer consists from 0.01 to 10 mol % of the repeating unit of formula (I) defined above and from 99.99 to 90 mol % of the repeating unit of formula (II), being the sum of the mol % of the repeating units of the copolymer 100%.

In a preferred embodiment, the repeating unit of formula (II) is selected from the group consisting of formula (IIa) and (IIb):

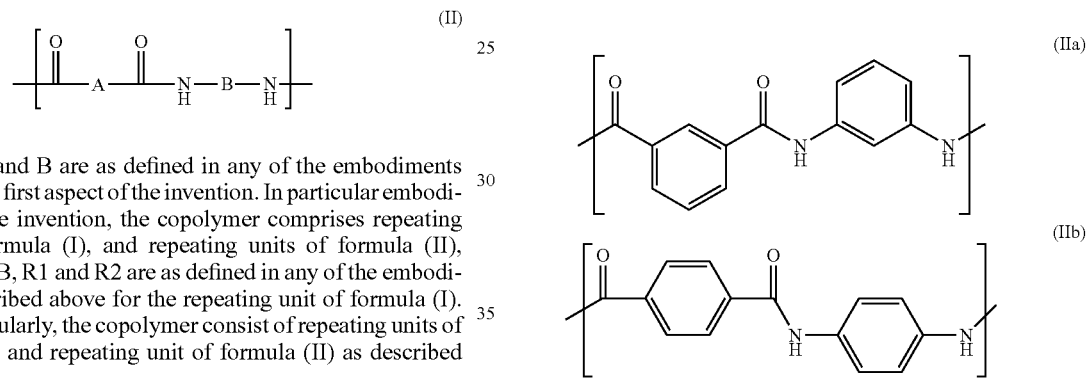

In the most particular embodiment of the invention, the copolymers are

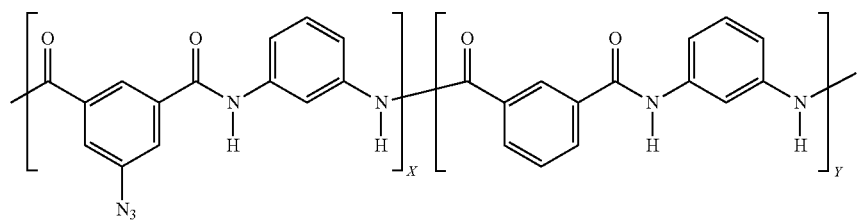

CP1: X/Y = 10/90
CP2: X/Y = 1/99

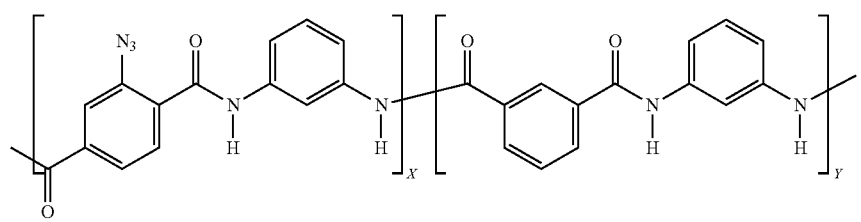

CP3: X/Y = 10/90 where X is the percent molar fraction (mol %) of the repeating unit of formula (I) in the copolymer and Y is the mol % of the repeating unit of formula (II) in the copolymer.

As is known in the art, the representation of the copolymer structure used herein, wherein both repeating units are drawn contiguously, has to be interpreted for statistical purposes only so that in the real copolymer the repeating units are located in a random sequence.

In a particular embodiment of the invention, the copolymer of the invention is a block copolymer, more particularly a short ordered block copolymer.

Polymers and copolymers comprising the repeating unit of formula (I) may be prepared by a process comprising the step of reacting a diacyl monomer and a diamine monomer, following known methods in the art for the polymerization of polyamides and aramids (see, for example, Garcia et al. "High-performance aromatic polyamides", Progress in Polymer Science, 35, 623-686, 2010; Yang et al. "Aramid Fibers" in "Handbook of Fiber Chemistry", Ch. 13, pp. 985-1000, M. Lewin Ed., Boca Ratón, 2007).

According to the present invention, a monomer is a compound capable of reacting with the same or different molecules to form the repeating units forming a polymer, for example, m-phenylenediamine (MPD), isophthaloyl dichloride (IPC), 5-azidoisophthaloyl dichloride, and 2-azidoterephaloyl dichloride.

Generally, a diacyl monomer of formula (III) and a diamine monomer of formula (IV)

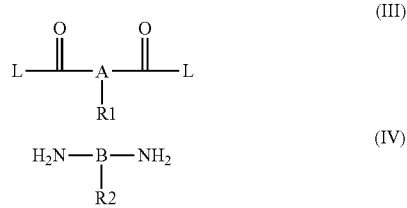

where R1, R2 and the proviso are as defined in formula (I) and L is a leaving group, such as a chloride atom, are reacted by, firstly, dissolving the diamine compound in a polar organic solvent or a mixture of solvents, for instance N-methyl-2-pyrrolidone (NMP) or N,N-dimethylacetamide (DMAc) or a mixture thereof, optionally in the presence of a calcium or lithium halide, e.g. $CaCl_2$ and LiCl, and in a nitrogen atmosphere at room temperature. Then, an equimolar amount of diacyl compound is added to the solution. The mixture is allowed to react and the final solution is poured slowly into water, forming a white, fibrous, and swollen polymer precipitate which is filtered off, washed, and dried. The yield of such preparation process can be nearly quantitative.

Monomers of formula (III) and (IV) are commercially available or can be readily obtained by processes well-known in the art. For example, meta-phenylenediamine is commercially available and 5-azidoisophthaloyl dichloride can be obtained through the reaction of 5-aminoisophtalic acid with sodium azide in acidic conditions followed by the acylation of the carboxyl groups with $SOCl_2$.

Preferred and particular compounds of formula (IV) and (III) are those yielding the preferred and particular polymers comprising the repeating units of formula (I) mentioned above.

Copolymers including repeating units of formula (I) and other repeating units, for instance those of formula (II) and those obtained by reaction of the diamines and diacyl monomers of Scheme 1 and Scheme 2, can be also obtained by the processes described above using the same reagents of formula (III) and formula (VI) described in the particular and preferred embodiments for the process above together with additional diamine and diacyl monomers. Suitable additional monomers are, for instance, those on Scheme 1 and Scheme 2.

The control of the molar fraction of the different repeating units in the copolymer can be achieved by reacting the monomers in the specific molar relationship desired for the target copolymer. For instance, for the preparation of CP1, a copolymer with a molar ratio of repeating units of X/Y=10/90, the molar ratio of isophthaloyl dichloride, 5-azidoisophthaloyl dichloride, and meta-phenylenediamine reagents added is 0.9:0.1:1.0. Alternatively, for the preparation of CP2, a copolymer with a molar ratio of repeating units of X/Y=1/99, the molar ratio of isophthaloyl dichloride, 5-azidoisophthaloyl dichloride, and meta-phenylenediamine reagents is 0.99:0.01:1.00.

For the preparation of the preferred random copolymers, monomers are poured over the reaction mixture at once. Alternatively, block copolymers could be obtained by means of controlling the feeding rate of at least one of the comonomers in the reactor.

In a particular embodiment of the invention, the non-crosslinked polymer comprising the repeating unit of formula (I) is in the form of a membrane, a film, a coating, an enamel, a filament or a fiber. More particularly, the non-crosslinked polymer comprising the repeating unit of formula (I) is in the form of a membrane, a film, a coating, or an enamel. Alternatively, the non-crosslinked polymer comprising the repeating unit of formula (I) is in the form of a filament or a fiber.

In a particular embodiment of the invention, the non-crosslinked polymer comprising the repeating unit of formula (I) is processed, for instance in the form of a membrane, a film, an enamel, a coating, a fiber or a filament, before being subjected to the cross-linking process of the invention. Polymer processing can be carried out by processes and techniques which are part of the general knowledge of those skilled in the art (see, for example, Yang et al. "Aramid Fibers" in "Handbook of Fiber Chemistry", Ch. 13, pp. 985-1000, M. Lewin Ed., Boca Ratón, 2007).

Polymers and copolymers of the invention can be transformed to dense polymer films, coatings, and enamels by conventional casting technique. Polymer films can be prepared by evaporation of cast solutions of the polymer, for instance from 3% to 20% of polymer by weight, in a suitable organic polar solvent, for example in N-methyl-2-pyrrolidone, N,N-dimethylacetamide, N,N-dimethylformamide (DMF), or their mixtures. Once the solution is homogenized, the solvent is eliminated by heating, optionally under vacuum yielding a dense polymer film.

Coatings and enamels can be obtained as films above. Coatings and enamels are similar to films, but instead being an standalone material as films, they are deposited on a surface for protection, reinforcement or isolation.

Alternatively, polymers and copolymers of the invention can be transformed into porous membranes by phase inversion technique. A dope solution containing the polymer or copolymer, for instance 5-25% of polymer by weight, in a suitable organic polar solvent, for example N-methyl-2-pyrrolidone, N,N-dimethylacetamide, N,N-dimethylformamide, or its mixtures can be spread on a flat surface using a Doctor Blade for controlling the membrane thickness. The spread membrane is immediately immersed into a coagulation bath at a suitable temperature, usually ranging from 10 to 90° C., to fix its structure. Suitable coagulation baths can comprise a mixture of chloride salts, e.g. LiCl or CaCl$_2$, a suitable organic polar solvent, for example N-methyl-2-pyrrolidone, N,N-dimethylacetamide, N,N-dimethylformamide, or its mixtures, and, a polymer non-solvent, for example water.

The polymers and copolymers of the invention can be also transformed in fibres and filaments by methods well known in the art. For example, a polymer solution, for instance with a concentration in solids from 15 to 25% by weight, can be transformed into fibres by means of dry or wet spinning. Generally, conventional wet spinning processes are considered more suitable as wet spinning implies lower energy consumption than dry spinning. Wet spinning processes encompass extruding the polymer solution through a spinneret which is submerged in a coagulating medium comprising a solvent and a non-solvent. The resulting filaments, after the spinning process, are stretched, for example from 1 to 4 times, to develop and stabilize the fibre, and, after drying and crystallization a continuous filament yarn can be obtained by direct winding or converted into staple fibre after applying a crimping and cutting process which will give the material a cotton-like texture.

Figure 7:
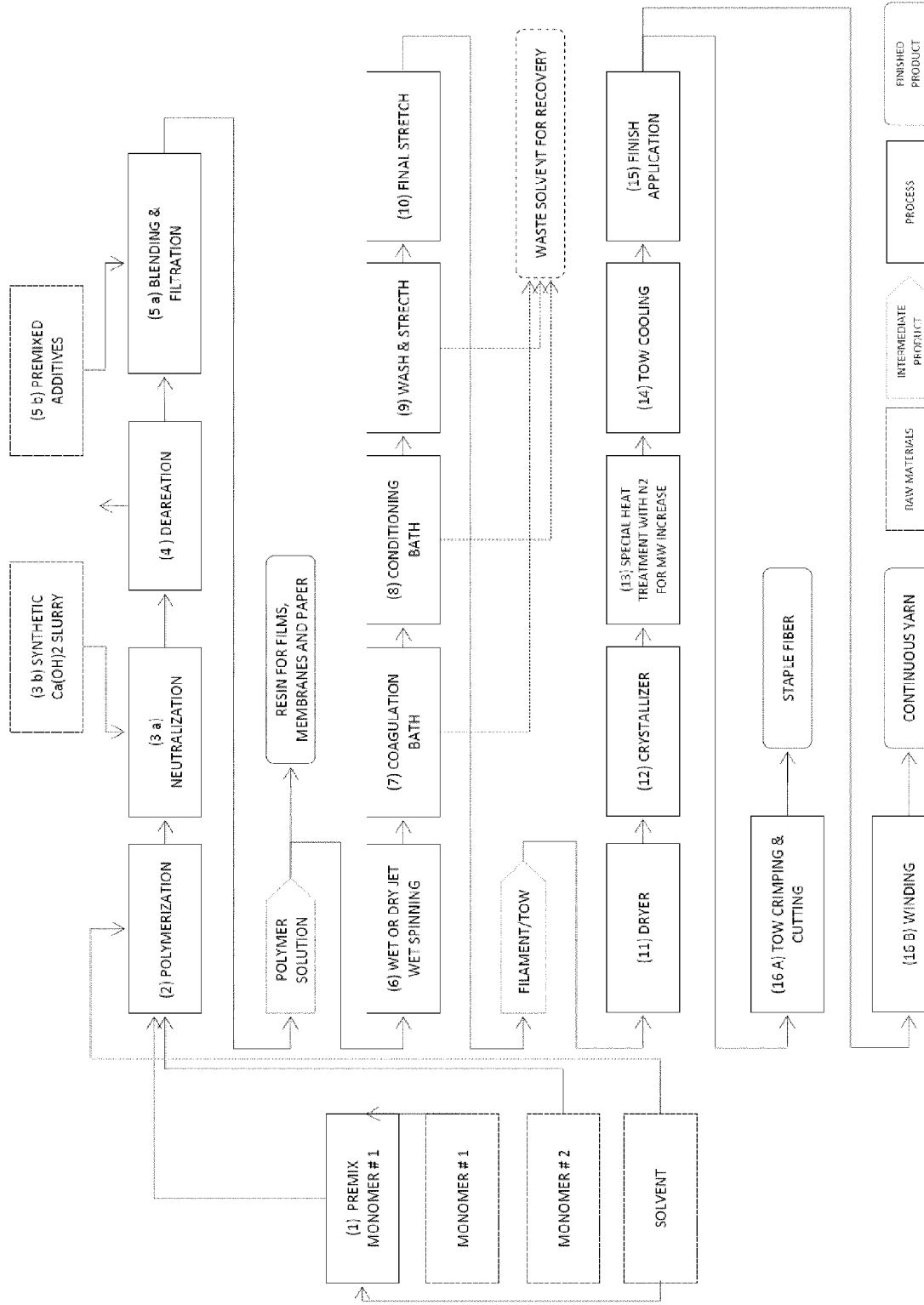
FIG. 7 Provides a block diagram of an embodiment of the process for transforming the polymer containing the repeating unit of formula (I) in a resin for the preparation of membranes and films, filaments and fibers.

The continuous yarn and staple fibre obtained can then be converted into fabrics and used in all application where exceptional thermal, chemical and mechanical resistance are required. FIG. 7 details an embodiment of the process for transforming the polymer containing the repeating unit of formula (I) in a resin for the preparation of membranes and films, filaments and fibers.

The block diagram shown in FIG. 7 provides a particular process flow in which the polymer solution with a concentration of solids from 15 to 25% is extruded through a suitable die [step 6]. Then the extruded filaments are coagulated in a bath containing from 30 to 60% solvent and fresh water as non-solvent at a temperature from 10 to 60° C. The solvent/non-solvent ratio is controlled by the addition of fresh water to the bath [step 7]. For example, suitable solvents are N,N-dimethylacetamide, N-methyl-2-pyrrolidone and dimethylformamide. Then, the coagulated filaments are conditioned in a bath at the same temperature but at lower concentration of solvent, from 15 to 40%. The stretching is carried out in baths with lower solvent concentrations, from 0 to 15% and higher temperatures up to 95° C. in a counter current system of baths to extract the salt and solvent from the fibre structure [steps 8 to 10]. The maximum velocity of the process depends upon the combination of multiple factors during the spinning process, speeds between 40 to 125 meters per minute can be achieved provided that the set of spinning conditions and the after treatment process are properly balanced. Process productivity is increased by using a higher number of dies and/or increasing the surface and the number of capillaries per die. [steps 11 and 12] depict a conventional after treatment process of the filament tow comprising a drying step at temperatures comprised of from 120 and 220° C. and residence time from 2 to 6 seconds. Optionally, a crystallization step can be carried out by treating the filament tow at temperatures comprised between 250 and 340° C. and residence time up to 5 seconds. [step 13] The cross-linking process is carried out in a heated chamber. Heat is transmitted to the filament tow by means of radiating heat and hot air, optionally in nitrogen atmosphere. [steps 14 to 16] consist of standard industrial methods for winding continuous filament yarn [16a] or converting the filament tow in staple fibre [16b].

As said above, a cross-linked aramid polymer obtainable by the thermal treatment of the non-crosslinked polymer comprising the repeating unit of formula (I) as described in the first aspect of the invention is also an object of the present invention.

The cross-linked aramid polymer "obtainable by" the process of the invention is used here to define the cross-linked aramid polymer by the process for obtaining it and refers to the product obtainable by the preparation process comprising the step of heating the non-crosslinked starting polymer containing the repeating unit of formula (I) as defined above. For the purposes of the invention the expressions "obtainable", "obtained" and equivalent expressions are used interchangeably, and in any case, the expression "obtainable" encompasses the expression "obtained".

As stated above, the cross-linked aramid polymer "obtainable by" the process of the invention shows good mechanical, electric and thermal properties.

Mechanical properties, as Young's modulus and tensile strength, of the cross-linked polymer have been obtained on a dynamometer at room temperature using polymer strips cut from polymer dense films of 30-45 μm thickness. The films were obtained by the conventional casting procedure, at a lab scale, and without orientation. Mechanical clamps were used and an extension rate of 5 mm/min was applied using a gauge length of 10 mm.

Homopolymer, copolymer and polymer model solubility was determined by mixing 10 mg of material with 1 mL of solvent, followed by stirring for 24 h at 20° C., considering the polymer soluble at room temperature if a homogeneous solution was obtained. If it was not soluble, the system was heated to reflux for 2 h, considering the polymer soluble on heating if a homogeneous solution was obtained. Otherwise it was considered insoluble or partially soluble.

Thermal properties recorded on thermobalance using 5-mg of polymer or copolymer material, cut from 50-70 μm membranes, under a nitrogen and/or oxygen atmosphere at a scan rate of 10° C./min. The recorded thermal properties were $T_5$ and $T_{10}$, corresponding to the 5% and 10% material weight loss, and the percentage of char yield at 800° C.

LOI has been estimated according with the experimental Van Krevelen equation (D. W. Van Krevelen and K. to Nijenhuis, "Properties of Polymers. Their correlation with chemical structure; their numerical estimation and prediction from additive group contributions", Elsevier, Amsterdam, 4rd edn., 2009, pp. 855-857).

In a preferred embodiment, the process of the first aspect of the invention further comprises an additional step of heating the cross-linked aramid polymer comprising the repeating unit of formula (I) at a temperature comprised of from 240 to 420° C. for a period of time comprised of from 1 second to 15 minutes. In a preferred embodiment, the temperature of the additional thermal treatment is comprised of from 300 to 400° C., more preferably 400° C.

In a particular embodiment the cross-linked polymer is cooled after the cross-linking process, for instance to room temperature, before carrying out the additional heating step.

In a particular embodiment, the cross-linked aramid polymer is in the form of a film, a membrane, an enamel, or a coating, and the additional heating step is carried out for a period of time of from 1 minute to 15 minutes.

In an alternative particular embodiment, the cross-linked aramid polymer is in the form of a fiber or a filament, and the heating step is carried out for a period of time of from 1 second to 15 seconds, more preferably 3 seconds.

Through such additional thermal treatment, the properties of the cross-linked aramid polymer can be fine-tuned by further increasing the molecular weight of the polymers in order to meet the specific requirements of the target application.

As it is mentioned above, the use of a cross-linked aramid polymer obtainable by the process as defined above in composite materials, filtration, heat or electric insulation, and heat or impact protection applications forms part of the invention.

This aspect of the invention can be formulated as a cross-linked aramid polymer obtainable by the process as defined above, for the preparation of a composite material, a material for phase separation or filtration, heat or electric insulation, or heat or impact protection.

The cross-linked aramid polymer of the invention in the form of filaments, fibers, membranes, films, coatings, and enamels are intended to provide improved features to any application of known aramids. For example, cross-linked aramid fibers and fabrics can be used to produce all kinds of synthetic materials for instance ballistic applications, civil engineering products, composites, conveyor and transmission belts, hot gas filtration bags, cut-protection products, elastomer reinforcements, engineering plastics, friction products, heat-protection products, optical fiber cables, reinforced pipes, hoses, ropes and cables, sealing materials, specialty paper products, tires, adhesives, sealants, and coatings. As a further example, membranes with an active layer show high salt rejection, high water permeability and high fouling tolerance and can be used in waste-water treatment, desalination of sea water and dialysis.

The cross-linked aramid polymer of the invention is suitable for preparing fabrics for filtration, anti-static applications, plastic coverings, and medical products. For instance, the cross-linked aramid polymer of the invention can be processed into flame-resistant, heat, abrasion and impact protective fabric or solid, for example in flame-resistant and/or heat protective clothing and helmets, cut resistant clothing, ballistic vests, body armour, and ballistic protective structures.

The cross-linked aramid polymer of the invention is also suitable for improving the reinforcing properties of known aramids in composite materials. Composite materials are composed of the aramid polymer, for instance in the form of a fiber, filament, membrane, film, enamel, or coating, in combination with an additional material, for example carbon fiber and glass fiber, in a matrix, usually epoxy resin. Typical applications include automotive and aeronautical structural parts, as monocoque bodies for cars, fuselage and wings in airplanes and boat hulls.

Additional applications of cross-linked aramid polymer in the form of filaments, fibers, membranes, films, coatings, and enamels, can include asbestos replacement, as in automotive and aeronautic brake components, jet engine enclosures, fiber reinforced concrete, tyres, mechanical rubber ware reinforcement, ropes and cables, sporting goods as sail cloth and boat hulls, telecommunication and media applications as optical fiber cable systems and loudspeaker diaphragms, applications in cryogenic technology, electrical insulation.

The invention also encompasses a composite material comprising the cross-linked aramid polymer of the invention.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

EXAMPLES

Measurement Equipment and Conditions

Chemical characterization of polymers, copolymers and monomers Nuclear Magnetic Resonance: $^1$H and $^{13}$C NMR spectra were recorded with a Varian Inova 400 spectrometer operating at 399.92 and 100.57 MHz, respectively, with deuterated dimethylsulfoxide (DMSO-$d_6$) as solvent. Infrared spectra: FT-IR were recorded with a Nicolet Impact spectrometer or with a JASCO FT/IR-4100 fitted with a PIKE TECH "Miracle" ATR. Low-resolution electron impact mass spectra: EI-LRMS were obtained at 70 eV on an Agilent 6890N mass spectrometer.

Thermal Characterization of Polymers and Copolymers

Thermogravimetric analysis: TGA data were recorded on a 5 mg sample under a nitrogen atmosphere on a TA Instrumenta Q50 TGA analyser at a scan rate of 10° C./min.

Limiting oxygen index: LOI was estimated according with the experimental Van Krevelen equation (D. W. Van Krevelen and K. to Nijenhuis, "Properties of Polymers. Their correlation with chemical structure; their numerical estimation and prediction from additive group contributions", Elsevier, Amsterdam, 4rd edn., 2009, pp. 855-857.) (LOI=17.5+0.4 CR, where CR is the char yield in % weight at 800° C. obtained by from TGA measurements in nitrogen atmosphere).

Solubility

Polymer solubility was determined by mixing 10 mg of polymer with 1 mL of solvent, followed by stirring for 24 h at 20° C., considering the polymer soluble at room temperature if a homogeneous solution was obtained. If it was not soluble, the system was heated to reflux for 2 h, considering the polymer soluble on heating if a homogeneous solution was obtained. Otherwise it was considered insoluble or partially soluble.

Mechanical Properties

To determine the tensile properties of the polymers, strips (5 mm in width and 30 mm in length) were cut from polymer dense films of 30-45 µm thickness on a Hounsfield H10KM Universal Testing Dynamometer at 20° C. Mechanical clamps were used and an extension rate of 5 mm/min was applied using a gauge length of 10 mm. At least six samples were tested for each polymer and the data was then averaged.

Example 1

Synthesis of Comparative Non-Crosslinked Poly(m-Phenylene Isophthalamide) (MPD-I)

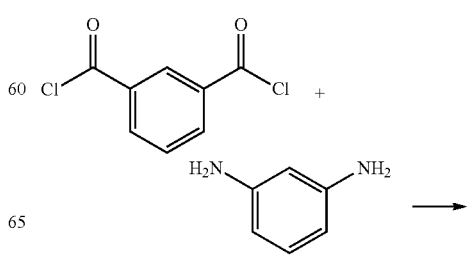

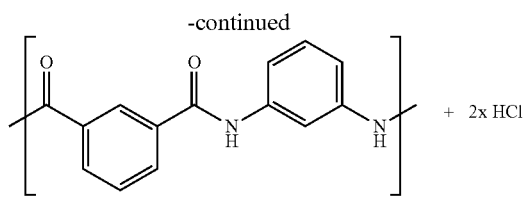

Known m-aramid, poly(m-phenylene isophthalamide), MPD-I commercialized as Nomex®, Teijinconex®, Arawin®, etc., has been prepared as a reference for comparing thermal and mechanical properties of the novel cross-linked aramids of the present invention.

A 200-mL, double-walled glass flask equipped with a nitrogen inlet and a mechanical stirrer was charged with 80 mL of N,N-dimethylacetamide under a blanket of nitrogen at room temperature. Then, 6.921 g (64 mmol) of m-phenylenediamine (MPD) were added. The solution was stirred at room temperature until diamine solution. Then, the system was cooled to 0° C. with a circulating system. Then, 12.993 g (64 mmol) of isophthaloyl dichloride was added portionwise (four equal amounts) over 5 min, the mixture was allowed to react under nitrogen at 0° C. for 30 min and then at 20° C. for an additional 3.5 h. The final solution was poured slowly into 800 mL of distilled water, forming a white, fibrous, and swollen polymer precipitate that was filtered off, washed thoroughly with water, and dried in a vacuum oven at 70° C. overnight. The yield was nearly quantitative. The inherent viscosity, obtained in sulfuric acid at a concentration of 0.5 g/dL and 30° C., was 2.1 dL/g.

Example 2

Synthesis of the Monomer 5-azideisophthaloyl dichloride

Synthesis of 5-azidoisophthalic acid

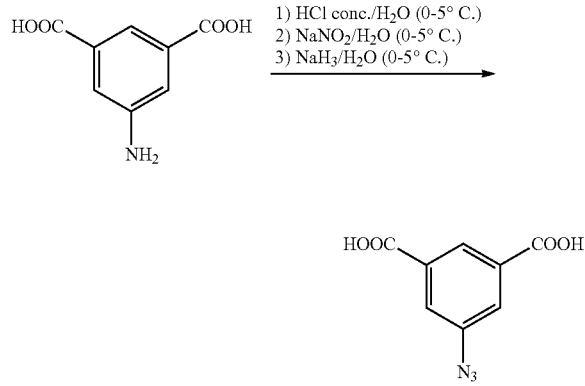

73 mmol of 5-aminoisophtalic acid were placed in a beaker together with 100 mL of water. 18 mL of HCl (37%) were added dropwise. The mixture was cooled in an ice bath at 0-5° C. 75.3 mmol of NaNO$_2$ were dissolved in 25 mL of distilled water and added dropwise to the mixture, stirring it for 30 minutes. Then, 73 mmol of NaN$_3$ were dissolved in 25 mL of distilled water and added dropwise to the mixture. A solid was formed and gas evolution was observed, making it difficult to keep the stirring. The mixture was stirred until the evolution of gas was no longer detected. The product was then filtered off, washed with distilled water, and dried at room temperature. Yield: 85%. M.p.: 250° C.

Characterization: $^1$H-NMR $\delta_H$ (400 MHz, DMSO-d$_6$, Me$_4$Si): 13.20 (2H, s, COOH); 8.23 (1H, s, Ph); 7.73 (2H, s, Ph). $^{13}$C-NMR, $\delta_C$ (100.6 MHz, DMSO-d$^6$, Me$_4$Si): 166.77, 141.54, 133.99, 127.17, 124.33. EI-LRMS m/z: 207 (M$^+$, 13), 179 (100), 123 (65), 105 (15), 90 (10), 89 (24), 78 (45), 64 (45), 63 (92), 52 (29), 45 (58). FT-IR [Wavenumbers (cm$^{-1}$)]: $v_{acid\ O-H}$: broadband (3090); $v_{N=N}$; 2122; $v_{C=O}$: 1715.

Synthesis of 5-azidoisophthaloyl dichloride

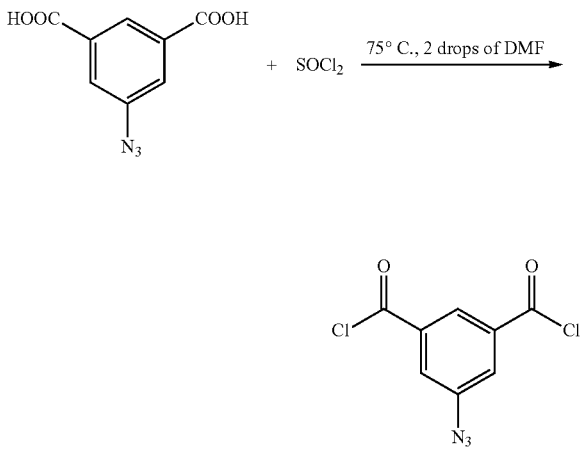

In a round-bottom flask, 24 mmol of 5-azidoisophthalic acid were added, together with about 50 mL of SOCl$_2$. A few drops of DMF were added as catalyst. The mixture was heated at 75° C. and stirred for 30 minutes. Then, the solution was vacuum distilled. The solid obtained was crystallized in about 150 mL of dry heptane. A second crystallization was carried out adding a few drops of SOCl$_2$ to the hexane, in order to assure the absence of water. The solid was dried under vacuum, preventing its exposition to sunlight and/or humidity. Yield: 43%. M.p.: 63° C.

Characterization: $^1$H-NMR $\delta_H$ (400 MHz, DMSO-d$^6$, Me$_4$Si): 8.20 (1H, s, Ph); 7.75 (2H, s, Ph). $^{13}$C-NMR, $\delta_C$ (100.6 MHz, DMSO-d$^6$, Me$_4$Si): 165.19, 142.02, 132.62, 127.17, 125.14. EI-LRMS m/z: 244 (M$^+$, 15), 217(100), 153 (65), 126 (15), 90 (12), 89 (22), 78 (46), 64 (43), 63 (90). FTIR [Wavenumbers (cm$^{-1}$)]: $v_{acid\ O-H}$: broadband (3069); $v_{N=N}$ 2114; $v_{C=O}$:1748.

Example 3

Syntheses of a Polymer Model (Model)

The validity of a difunctional compound as a condensation monomer can be achieved in different ways. The simplest and more effective one is the preparation of a polymer model and with good yield and without by-products. The excellent characteristics of 5-azidoisophthaloyl dichloride as condensation monomer was exemplified with the preparation of the corresponding model upon reaction with aniline under polymerization-like conditions Polyamide Model

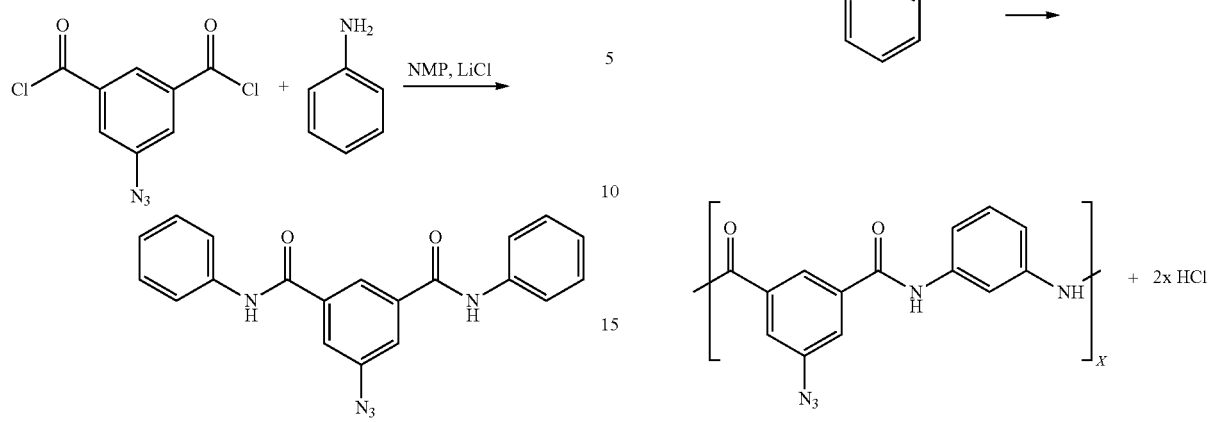

0.72 mmol of 5-azidoisophthaloyl chloride were added to a solution of 1.45 mL of NMP (5% LiCl) and aniline (1.44 mmol) at 0° C. and under a nitrogen blanket. A vigorous stirring was maintained for 30 minutes. The mixture was kept at room temperature for 4 hours, and then precipitated in water, and washed until a pH 7 was reached. Yield: 80%. M.p.: 285° C.

Characterization: $^1$H-NMR $\delta_H$ (400 MHz, DMSO-d$^6$, Me$_4$Si): 10.52 (2H, s, NH); 8.43 (1H, s, Ph); 7.9 (2H, s, Ph); 7.85 (4H, d, J 7.99, Ph); 7.42 (4H, m, Ph); 7.17 (2H, m, Ph). $^{13}$C-NMR, $\delta_C$ (100.6 MHz, DMSO-d$^6$, Me$_4$Si): 164.95, 141.11, 139.77, 137.75, 129.61, 124.95, 124.67, 121.96, 121.49. EI-LRMS m/z: 357 (M$^+$, 100), 328 (10), 239 (20), 208 (45), 184 (50), 146 (60), 120 (10), 93 (15), 77 (25). FTIR [Wavenumbers (cm$^{-1}$)]: $\nu_{N-H}$: broadband (3444); $\nu_{N\equiv N}$: 2119; $\nu_{C=O}$: 1644.

Example 4

Synthesis of the Non-Crosslinked Homopolymer poly(m-phenylene 5-azideisophthalamide) (HP)

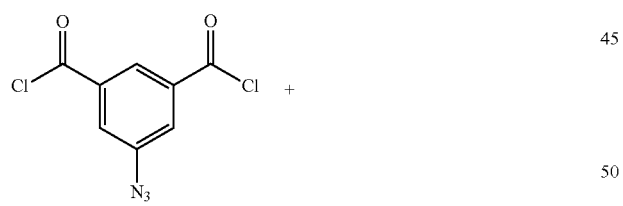

A 200-mL, double-walled glass flask equipped with a nitrogen inlet and a mechanical stirrer was charged with 80 mL of N,N-dimethylacetamide under a blanket of nitrogen at room temperature. Then, 6.921 g (64 mmol) of m-phenylenediamine (MPD) were added. The solution was stirred at room temperature until diamine solution. Then, the system was cooled to 0° C. with a circulating system. Then, 15.619 g (64 mmol) of 5-azidoisophthaloyl dichloride was added portionwise (four equal amounts) over 5 min, the mixture was allowed to react under nitrogen at 0° C. for 30 min and then at 20° C. for an additional 3.5 h. The final solution was poured slowly into 800 mL of distilled water, forming a white, fibrous, and swollen polymer precipitate that was filtered off, washed thoroughly with water, and dried in a vacuum oven at 70° C. overnight. The yield was nearly quantitative. The inherent viscosity, obtained in sulfuric acid at a concentration of 0.5 g/dL and 30° C., was 1.29 dL/g. The characterization of the polymer in terms of and $^1$H and $^{13}$C NMR is depicted in FIG. 1.

Example 5

Synthesis of the Non-Crosslinked Polymer poly[(m-phenylene 5-azideisophthalamide)-co-(m-phenylene isophthalamide) (CP1)

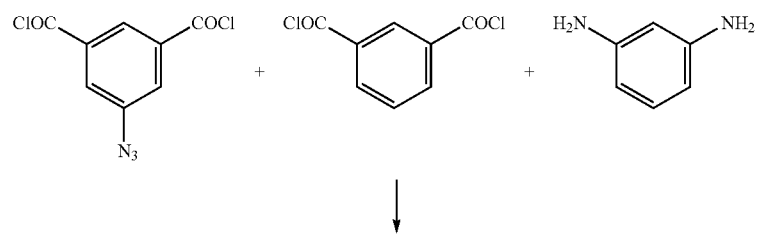

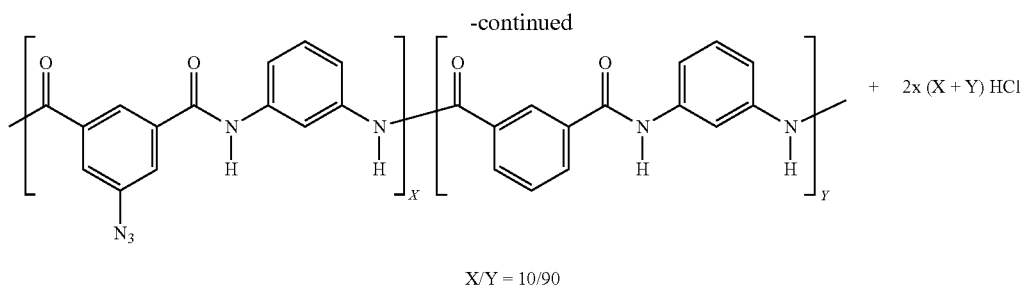

X/Y = 10/90

A 200-mL, double-walled glass flask equipped with a nitrogen inlet and a mechanical stirrer was charged with 80 mL of N,N-dimethylacetamide under a blanket of nitrogen at room temperature. Then, 6.921 g (64 mmol) of m-phenylenediamine (MPD) were added. The solution was stirred at room temperature until diamine solution. Afterwards, the system was cooled to 0° C. with a circulating system. Then, a mixture of 11.694 g (57.6 mmol) of isophthaloyl dichloride and 1.562 g (6.4 mmol) of 5-azidoisophthaloyl dichloride were added portionwise (four equal amounts) over 5 min, the mixture was allowed to react under nitrogen at 0° C. for 30 min and then at 20° C. for an additional 3.5 h. The final solution was poured slowly into 800 mL of distilled water, forming a white, fibrous, and swollen polymer precipitate that was filtered off, washed thoroughly with water, and dried in a vacuum oven at 70° C. overnight. The yield was nearly quantitative. The inherent viscosity, obtained in sulfuric acid at a concentration of 0.5 g/dL and 30° C., was 2.04 dL/g.

Figure 2:
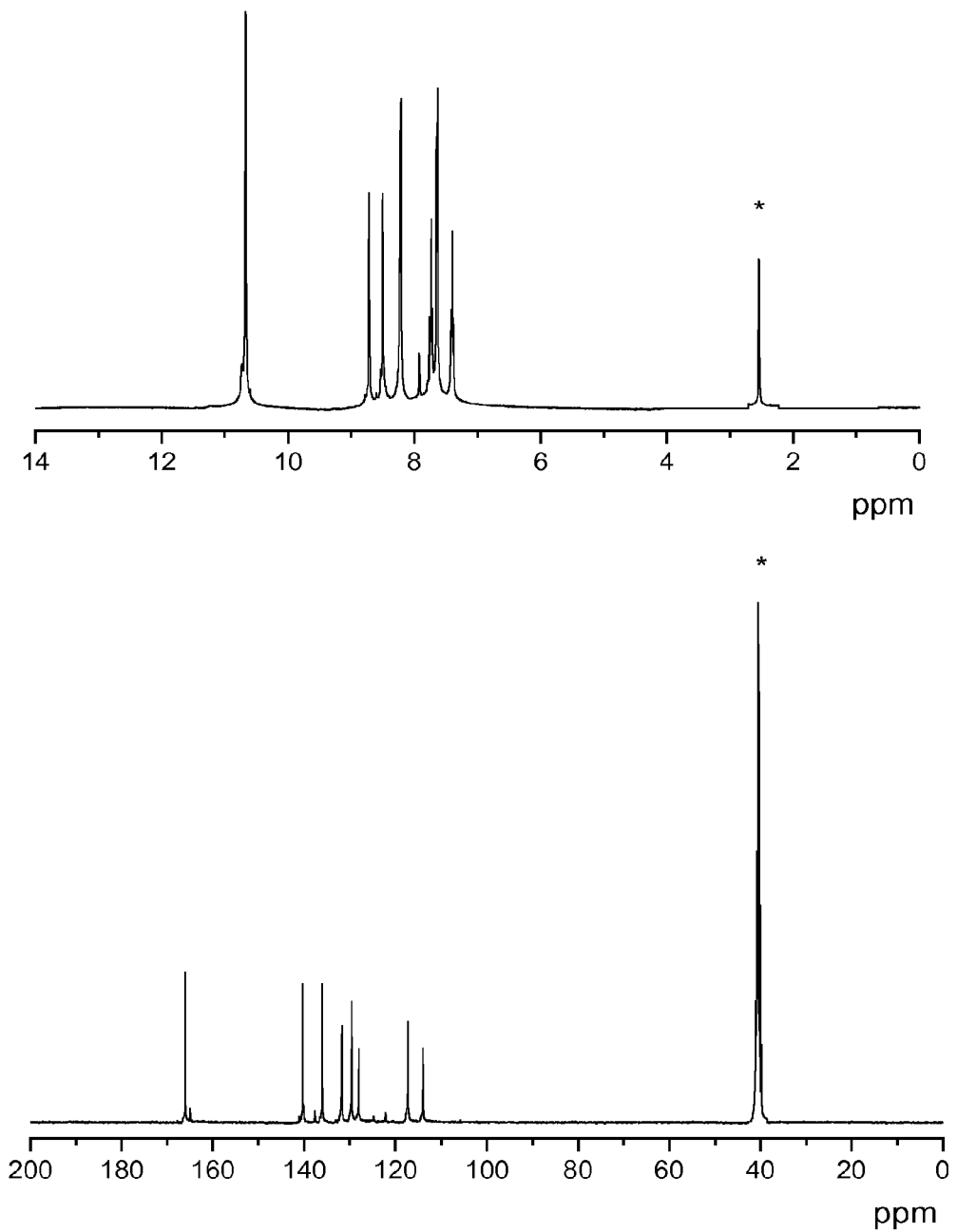
FIG. 2 $^1$H and $^{13}$C NMR data of non-crosslinked poly[(m-phenylene 5-azideisophthalamide)-co-(m-phenylene isophthalamide) (CP1). Solvent (DMSO-$d_6$) signal is marked as *.

The inherent viscosity, the solubility and the thermal properties of the polymer are depicted in Tables 1 and 2. The TGA data shows that the decomposition of the azide groups takes a place around 200° C. The characterization of the polymer in terms of $^1$H and $^{13}$C NMR is depicted in FIG. 2.

Figure 3:
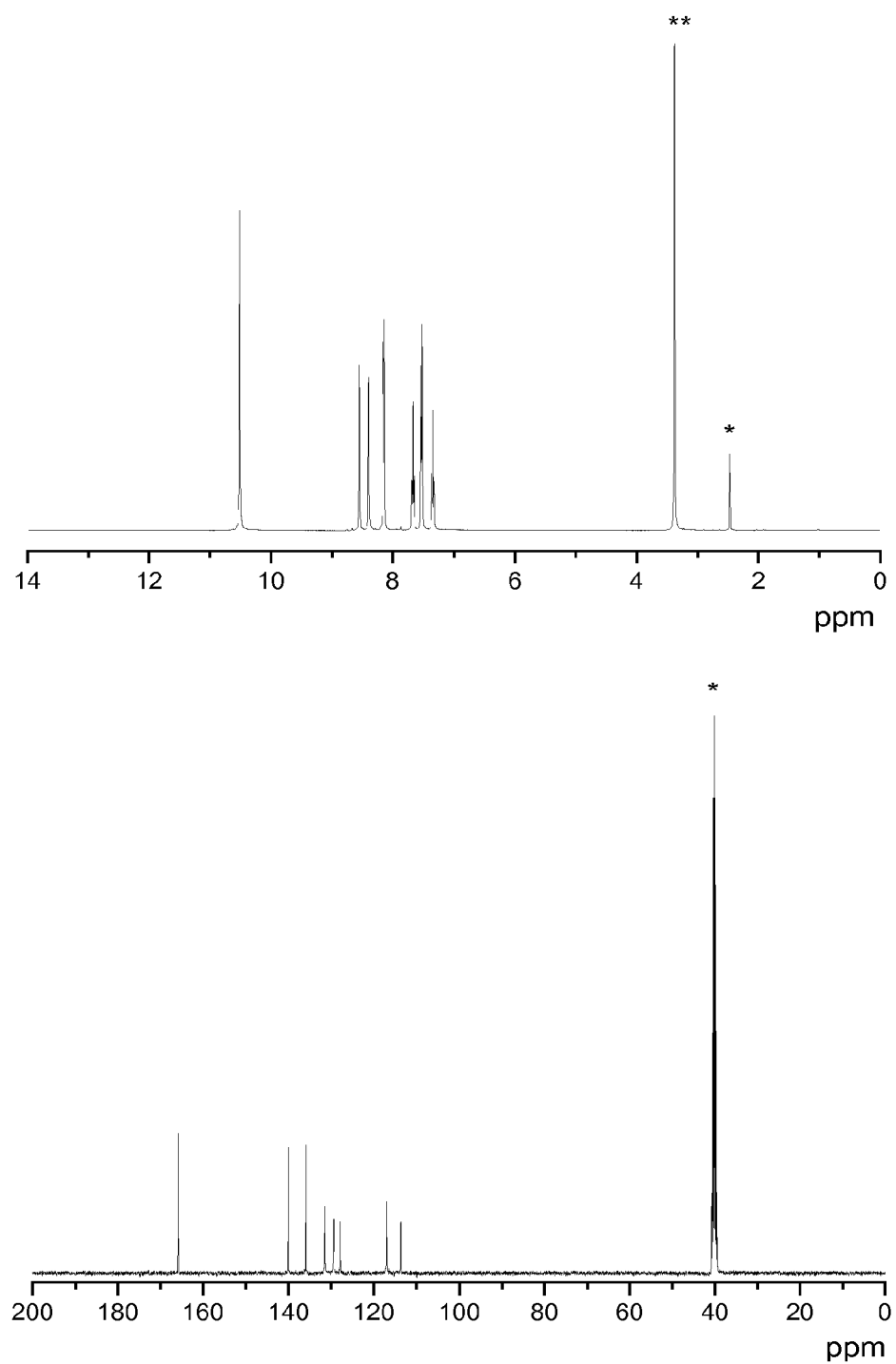
FIG. 3 $^1$H and $^{13}$C NMR data of non-crosslinked poly[(m-phenylene 5-azideisophthalamide)-co-(m-phenylene isophthalamide) (CP2). Solvent (DMSO-$d_6$) signal is marked as *, and water signal as **.

A 200-mL, double-walled glass flask equipped with a nitrogen inlet and a mechanical stirrer was charged with 80 mL of N,N-dimethylacetamide under a blanket of nitrogen at room temperature. Then, 6.921 g (64 mmol) of m-phenylenediamine (MPD) were added. The solution was stirred at room temperature until diamine solution. Afterwards, the system was cooled to 0° C. with a circulating system. Then, a mixture of 12.863 g (63.36 mmol) of isophthaloyl dichloride and 156 mg (0.64 mmol) of 5-azidoisophthaloyl dichloride were added portionwise (four equal amounts) over 5 min, the mixture was allowed to react under nitrogen at 0° C. for 30 min and then at 20° C. for an additional 3.5 h. The final solution was poured slowly into 800 mL of distilled water, forming a white, fibrous, and swollen polymer precipitate that was filtered off, washed thoroughly with water, and dried in a vacuum oven at 70° C. overnight. The yield was nearly quantitative. The inherent viscosity, obtained in sulfuric acid at a concentration of 0.5 g/dL and 30° C., was 1.65 dL/g. The inherent viscosity, the solubility and the thermal properties of the polymer are depicted in Tables 1 and 2. The TGA data shows that the decomposition of the azide groups takes a place around 200° C. The characterization of the polymer in terms of $^1$H and $^{13}$C NMR is depicted in FIG. 3.

Example 6

Syntheses of the Non-Crosslinked Polymer poly[(m-phenylene 5-azidoisophthalamide)-co-(m-phenylene isophthalamide) (CP2)

Example 7

Syntheses of the Non-Crosslinked Polymer poly[(m-phenylene 2-azidoterephthalamide)-co-(m-phenylene isophthalamide) (CP3)

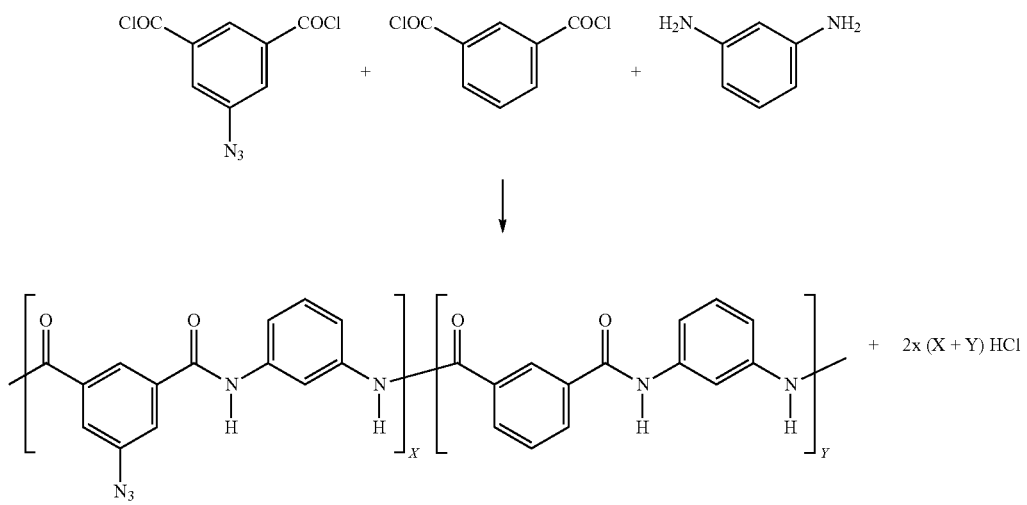

X/Y = 1/99

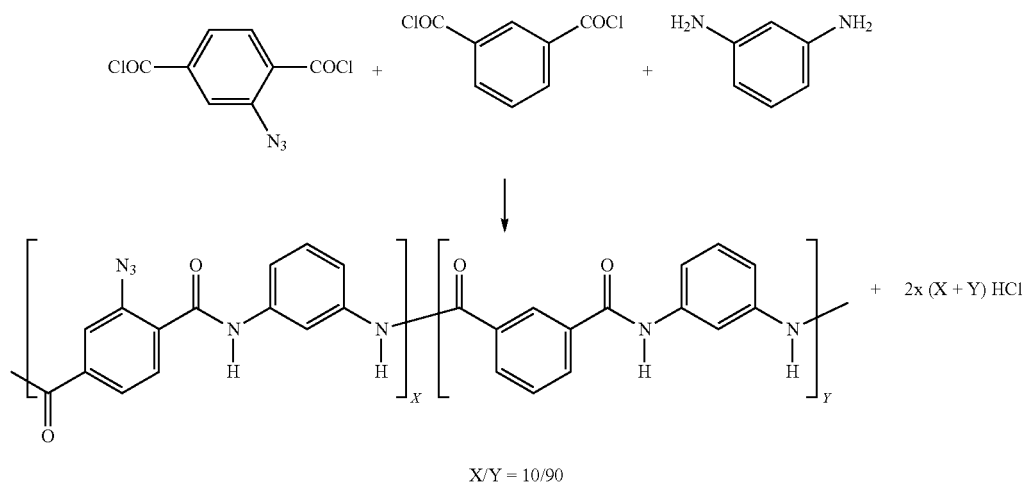

X/Y = 10/90

Figure 4:
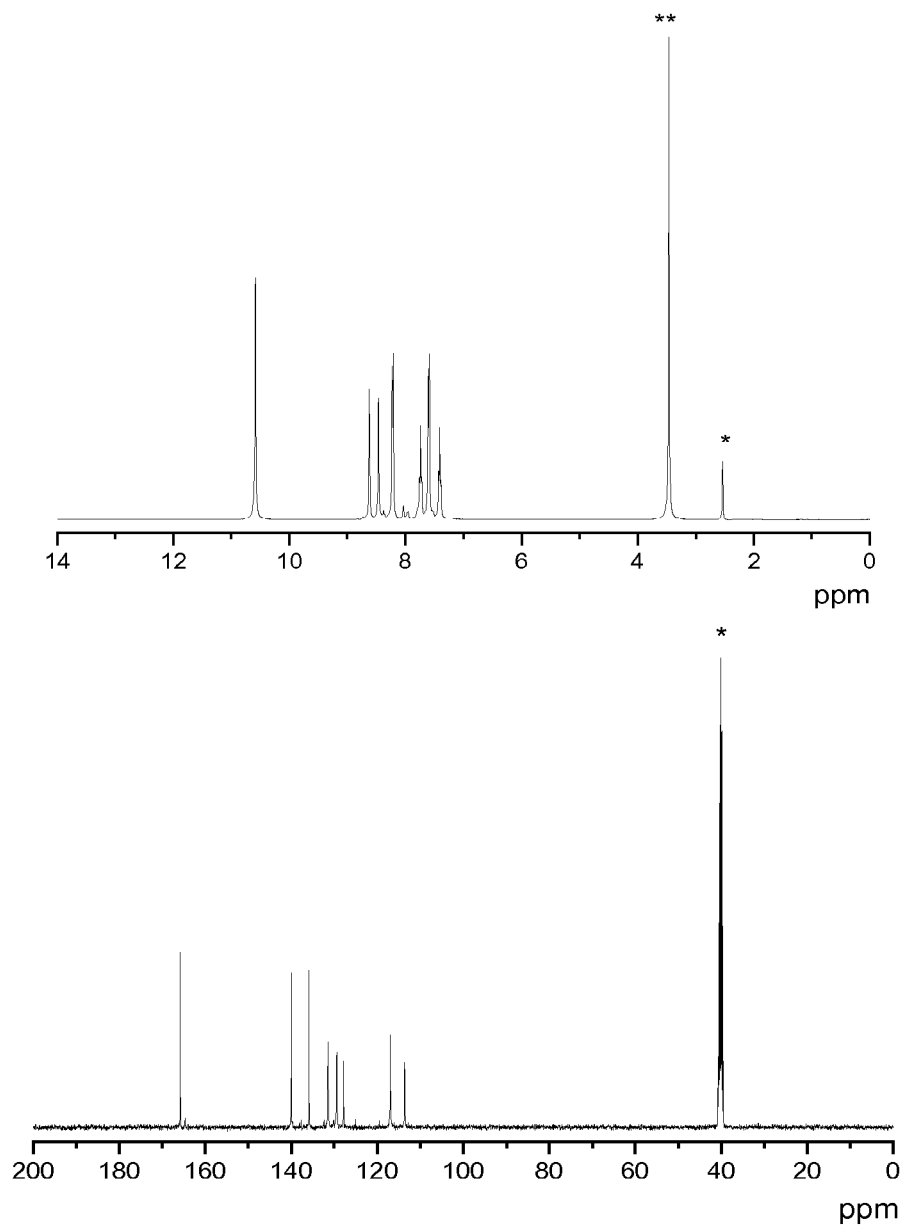
FIG. 4 $^1$H and $^{13}$C NMR data of non-crosslinked poly[(m-phenylene 2-azidoterephthalamide)-co-(m-phenylene isophthalamide) (CP3). Solvent (DMSO-$d_6$) signal is marked as *, and water signal as **.

A 200-mL, double-walled glass flask equipped with a nitrogen inlet and a mechanical stirrer was charged with 80 mL of N,N-dimethylacetamide under a blanket of nitrogen at room temperature. Then, 6.921 g (64 mmol) of m-phenylenediamine (MPD) were added. The solution was stirred at room temperature until diamine solution. Afterwards, the system was cooled to 0° C. with a circulating system. Then, a mixture of 11.694 g (57.6 mmol) of isophthaloyl dichloride and 1.562 g (6.4 mmol) of 2-azidoterephthaloyl dichloride were added portionwise (four equal amounts) over 5 min, the mixture was allowed to react under nitrogen at 0° C. for 30 min and then at 20° C. for an additional 3.5 h. The final solution was poured slowly into 800 mL of distilled water, forming a white, fibrous, and swollen polymer precipitate that was filtered off, washed thoroughly with water, and dried in a vacuum oven at 70° C. overnight. The yield was nearly quantitative. The inherent viscosity, obtained in sulfuric acid at a concentration of 0.5 g/dL and 30° C., was 1.69 dL/g. The inherent viscosity, the solubility and the thermal properties of the polymer are depicted in Tables 1 and 2. The TGA data shows that the decomposition of the azide groups takes a place around 200° C. The characterization of the polymer in terms of $^1$H and $^{13}$C NMR is depicted in FIG. 4.

Example 8

Preparation of Polymer Films

Polymers and copolymers prepared in Comparative Example 1, Example 4, Example 5, Example 6 and Example 7 were transformed into dense polymer films by the conventional casting technique.

Films from polymers and copolymers MPD-I, HP, CP1, CP2 and CP3 were prepared by spreading a solution of the polymer or copolymer in N,N-dimethylacetamide (7% w/v) over a flat glass using a Doctor Blade. The solvent was eliminated by heating at a temperature of 60° C. for 6 h in an air-circulating oven, and then at 100° C. for 4 hours under vacuum (1 mmHg). The films were obtained upon dipping the glass with the film in pure water. Then, the film was dried at a temperature of 60° C. for 6 h in an air-circulating oven and stored.

Preparation of Polymer Membranes

Polymers and copolymers prepared in Example 1, Example 4, Example 5, Example 6 and Example 7 were transformed into porous membranes by the phase inversion technique.

The membranes obtained from MPD-I, HP, CP1, CP2, and CP3 were obtained by spreading a dope solution containing the polymer or copolymer (19% by polymer weight), $CaCl_2$ (9% by weight) in N,N-dimethylacetamide on a flat glass surface using a Doctor Blade to render a membrane thickness of 60 μm. The membrane was immediately immersed in a coagulation bath comprising 20% by weight of $CaCl_2$, 20% by weight of N,N-dimethylacetamide and water at a temperature of 70° C.

Unless otherwise indicated, all percentages by weight mentioned therein, of both calcium chloride and lithium chloride, are based on the weight of solvent (N-methyl-2-pyrrolidone or N,N-dimethylacetamide).

Example 9

Cross-Linking Procedure (Thermal Treatment)

The thermal treatment of the polymers and copolymers above 150° C. give rise to the cross-linking of the polymer materials, the higher the temperature the lower the time needed to the complete cross-linking of the materials. Polymer and copolymer films and membranes obtained by the aforementioned procedure were thermally treated at different temperatures and times to evaluate the properties of the cured (cross-linked) materials.

Figure 5:
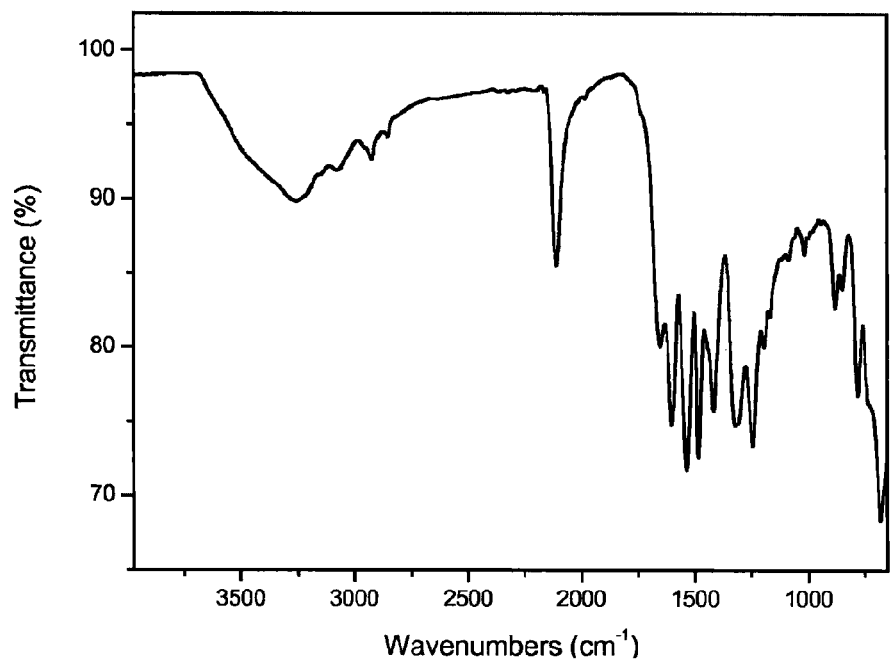
FIG. 5 IR-FT spectra of films and membranes prepared from the homopolymer HP before (non-crosslinked) (HP) and after (crosslinked) (tt-HP) the thermal treatment.
Figure 5:
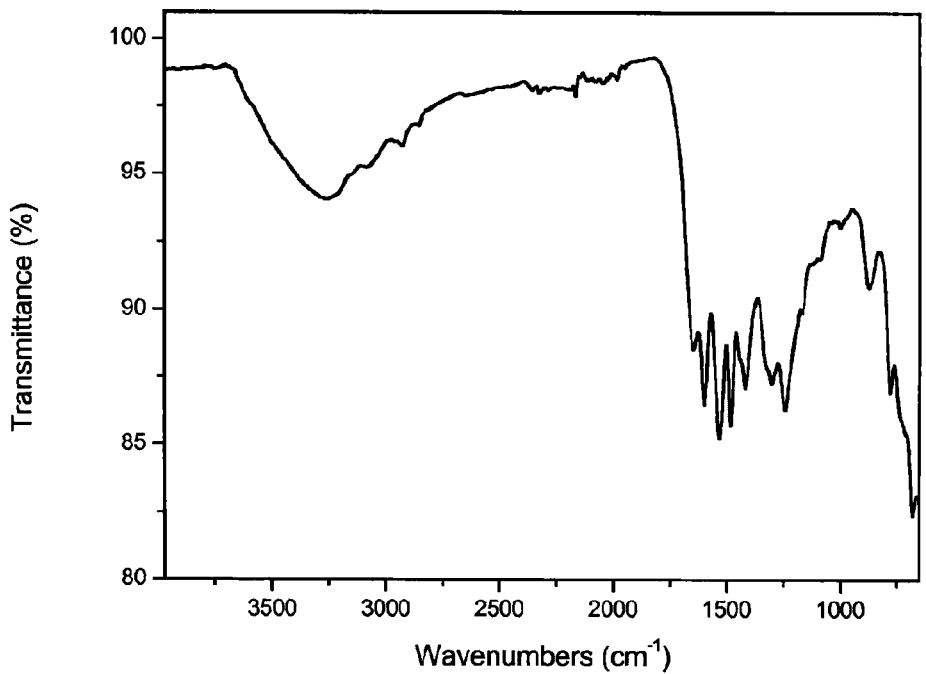
Figure 6:
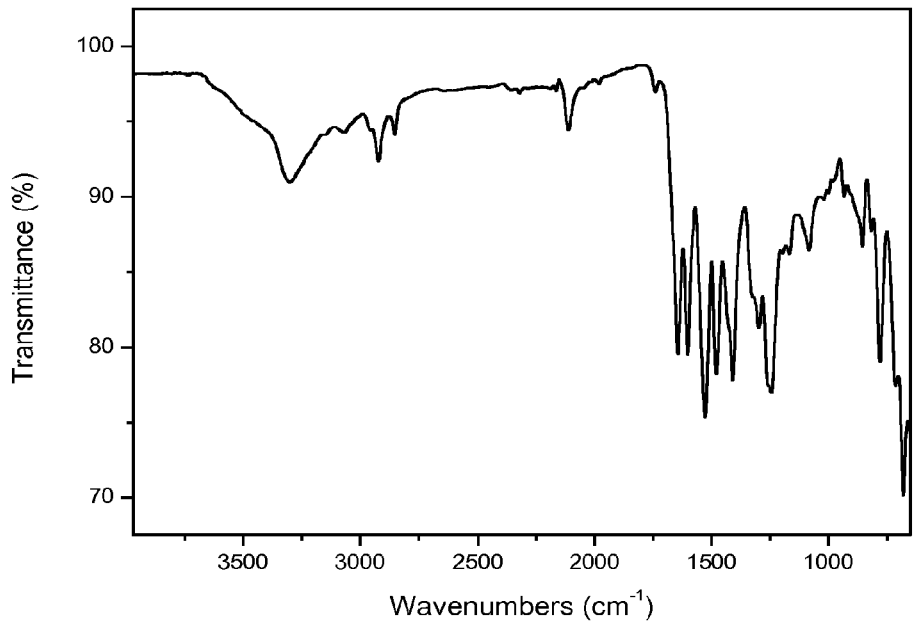
FIG. 6 IR-FT spectra of films and membranes prepared from copolymer CP1 before (CP1) and after (tt-CP1) the thermal treatment.
Figure 6:
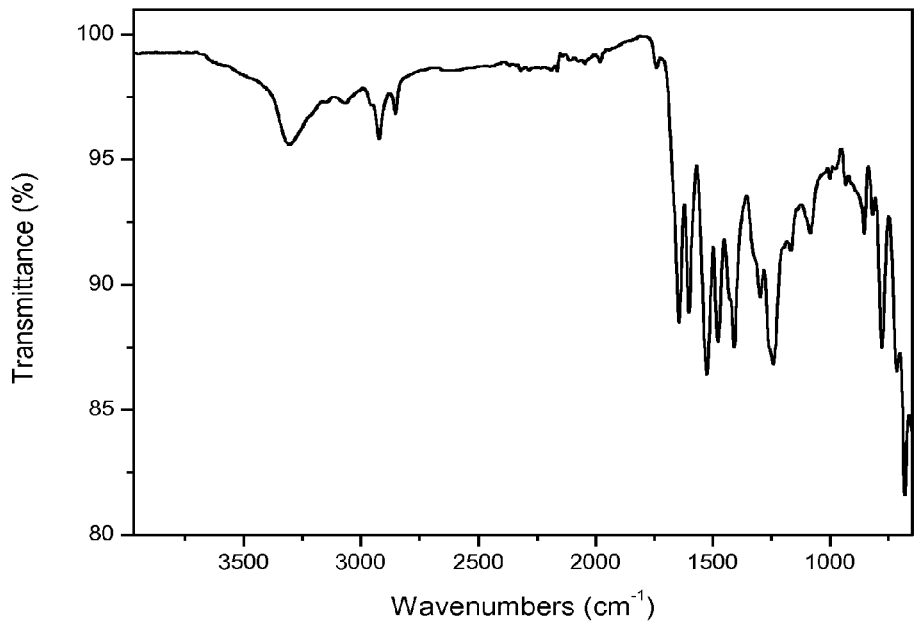

In this example, the films and membranes prepared in the example 8 were heated at 240° C. in an air-circulating oven for 10 min, and the solubility and the thermal and mechanical properties of the materials were evaluated. The solubility and the thermal properties were tested with films and membranes, the mechanical properties with films. The prefix "tt" of the polymer and copolymer codes indicate thermal treatment. Cross-linking was monitored through the disappearance of the azide group detected by IR-FT. Thus, the characteristic absorption band of the azide group at about 2109 cm$^{-1}$ disappeared after thermal treatment. FIG. 5 and FIG. 6 show the IR-FT spectra of films and membranes prepared from the homopolymer and from CP1 before and after the thermal treatment.

Previous to the thermal treatment, the non-crosslinked film and membrane shows the solubility depicted in Table 1. After thermal treatment, all cross-linked polymers of the invention were completely insoluble in the solvents shown in Table 1. Even the more insoluble commercial aramids, the para-aramids, are soluble in sulphuric acid. The insolubility of the films and membranes after thermal treatment in this strong acid clearly confirms the cross-linking of the materials. The inherent viscosity, the solubility and the thermal properties of the non-crosslinked polymer are depicted in Tables 1 and 2. The TGA data shows that the decomposition of the azide groups takes a place around 200° C.

TABLE 1

Inherent viscosities and solubility of the polymers.

| Polymer | $\eta_{inh}$ dLg$^{-1}$ | Solubility[a] | | | | | | |
|---|---|---|---|---|---|---|---|---|
| | | H$_2$SO$_4$ | DMAc | DMF | NMP | DMSO | CHCl$_3$, EtOH | THF |
| HP | 1.29 | ++ | ++ | + | ++ | ++ | − | − |
| CP1 | 2.04 | ++ | ++ | + | ++ | ++ | − | − |
| CP2 | 1.65 | ++ | ++ | + | ++ | ++ | − | − |
| CP3 | 1.69 | ++ | ++ | + | ++ | ++ | − | − |
| model | — | ++ | ++ | ++ | ++ | ++ | − | + |

[a]++ = Soluble at room temperature; + = soluble on heating; +− = partially soluble; − = insoluble.

TABLE 2

Thermal TGA data (nitrogen atmosphere)

| Polymer | T$_5$[a] (° C.) | T$_{10}$[b] (° C.) | Char yield (%) | LOI |
|---|---|---|---|---|
| MPD-I | 432 | 452 | 50 | 37 |
| HP | 194 | 275 | 55 | 39 |
| CP1 | 437 | 456 | 54 | 39 |
| CP2 | 421 | 454 | 50 | 38 |
| CP3 | 421 | 458 | 56 | 40 |

[a]5% weight loss;
[b]10% weight loss;
c) Limiting oxygen index (estimated with char yield data).

The thermal and mechanical properties of the cross-linked materials are depicted in Table 3 and 4, respectively. The data show a significant improvement in the said properties upon thermal treatment, thus confirming the cross-linking of the materials.

TABLE 3

Thermal TGA data (nitrogen atmosphere) of the polymer and copolymer membranes after 10 minutes at 240° C.

| Polymer | T$_5$[a] (° C.) | T$_{10}$[b] (° C.) | Char yield (%) | LOI |
|---|---|---|---|---|
| tt-HP | 439 | 471 | 59 | 41 |
| tt-CP1 | 435 | 454 | 56 | 40 |
| tt-CP2 | 435 | 457 | 58 | 41 |
| tt-CP3 | 433 | 457 | 58 | 41 |

[a]5% weight loss;
[b]10% weight loss;
c) Limiting oxygen index (estimated with char yield data).

TABLE 4

Mechanical properties of polymer and copolymer films without and with a thermal treatment at 240° C. (10 min).

| | Without thermal treatment | | | Heated at 240° C. for 10 min | |
|---|---|---|---|---|---|
| Polymer | Young's Modulus (GPa) | Tensile Strength (MPa) | Polymer | Young's Modulus (GPa) | Tensile Strength (MPa) |
| MPD-I | 1.4 | 63 | MPD-I | n.a. | n.a. |
| HP | 1.5 | 67 | tt-HP | 2.7 | 126 |
| CP1 | 1.4 | 59 | tt-CP1 | 2.9 | 127 |
| CP2 | 1.4 | 73 | tt-CP2 | 1.7 | 84 |
| CP3 | 1.0 | 48 | tt-CP3 | 1.1 | 64 | n.a.: not applicable

Example 10

Improving the thermal and mechanical behaviour of the cross-linked aromatic polyamides by means of further thermal treatment.

Further improvement of the thermal and mechanical behaviour of the cross-linked materials could be achieved by means of a new thermal treatment at above 240° C., the higher the temperature the lower the time needed, with an upper limit of 420° C. Copolymer films and membranes obtained by the aforementioned procedure were thermally treated at different temperatures and times to evaluate the properties of the cross-linked materials.

In this example, the raw copolymers prepared in Example 9, and their films obtained by casting, specifically tt-CP1 and tt-CP2, were heated at 400° C. in an air-circulating oven for 2 min to render copolymers ptt-CP1 and ptt-CP2. The prefix "ptt" of the copolymer codes indicate this additional thermal treatment.

The mechanical properties, in terms of Young's modulus and tensile strength, and the thermal properties, in terms of 5% and 10% weight loss, char yield and LOI (estimated with char yield data), were evaluated for ptt-CP1 and ptt-CP2. The data are depicted in Table 5. The data show that both properties are significantly improved by means of this additional thermal treatment (see comparatively Table 3, 4 and 5).

TABLE 5

Mechanical and thermal properties copolymer films after two thermal treatments: 240° C. (10 min) and 400° C. (2 min).

| | Mechanical properties | | Thermal properties | | | |
|---|---|---|---|---|---|---|
| Polymer | Young's Modulus (GPa) | Tensile Strength (MPa) | T$_5$[a] (° C.) | T$_{10}$[b] (° C.) | Char yield (%) | LOI |
| ptt-CP1 | 3.2 | 142 | 446 | 473 | 61 | 42 |
| ptt-CP2 | 1.8 | 89 | 439 | 466 | 59 | 41 |

[a]5% weight loss;
[b]10% weight loss;
c) Limiting oxygen index (estimated with char yield data).

REFERENCES CITED IN THE APPLICATION

D. W. Van Krevelen and K. to Nijenhuis, "Properties of Polymers. Their correlation with chemical structure; their numerical estimation and prediction from additive group contributions", Elsevier, Amsterdam, 4rd edn., 2009, pp. 855-857)

Yang et al. "Aramid Fibers" in "Handbook of Fiber Chemistry", Ch. 13, M. Lewin Ed., Boca Ratón, 2007.
Garcia et al. "High-performance aromatic polyamides", Progress in Polymer Science, 35, 623-686, 2010.
WO2008028605A2
WO2009130244A2

The invention claimed is:

1. A process for the preparation of a cross-linked aramid polymer comprising the step of heating a non-crosslinked polymer comprising the repeating unit of formula (I) at a temperature from 150 to 400° C. for a period of time from 1 second to 20 minutes,

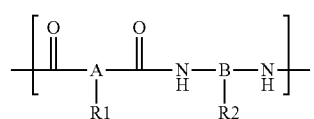
(I)

wherein A and B are independently selected from meta-phenylene and para-phenylene,

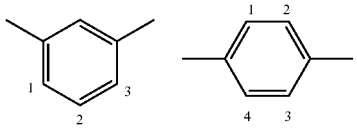

and R1 and R2 are independently selected from H and $N_3$, with the proviso that at least one of R1 and R2 is $N_3$, and R1 and R2 are attached to any of the positions 1, 2, 3, or 4 in para-phenylene and 1, 2, 3 in meta-phenylene.

2. The process according to claim 1, wherein the repeating unit of formula (I) is selected from the group consisting of a repeating unit of formula (Ia), (Ib), and (Ic).

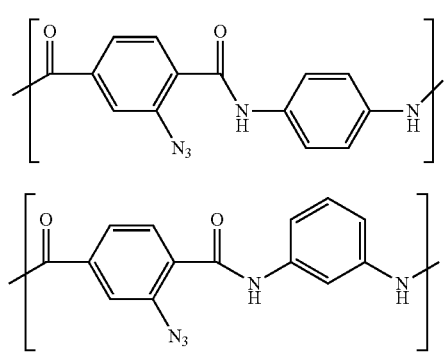
(Ia)
(Ib)
(Ic)

3. The process according to claim 1, wherein the non-crosslinked polymer comprising the repeating unit of formula (I) is a homopolymer.

4. The process according to claim 1, wherein the non-crosslinked polymer comprising the repeating unit of formula (I) is a copolymer which further comprises the repeating unit of formula (II)

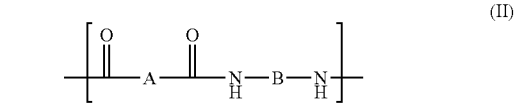
(II)

wherein A and B are as defined in claim 1.

5. The process according to claim 4, wherein the copolymer comprises from 0.01 to 10 mol % of the repeating unit of formula (I) defined above and from 99.99 to 90 mol % of the repeating unit of formula (II), being the sum of the moles of the repeating units of the copolymer 100%.

6. The process according to claim 4, wherein the repeating unit of formula (I) is selected from the group consisting of a repeating unit of formula (Ia), (Ib), and (Ic):

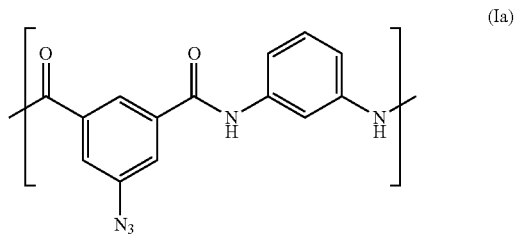
(Ia)

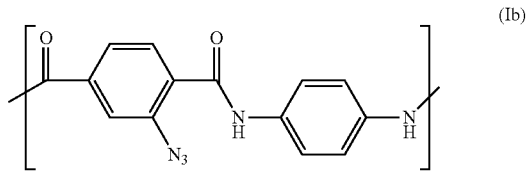
(Ib)

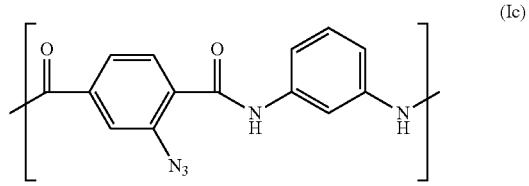
(Ic)

and wherein the repeating unit of formula (II) is selected from the group consisting of formula (IIa) and (IIb):

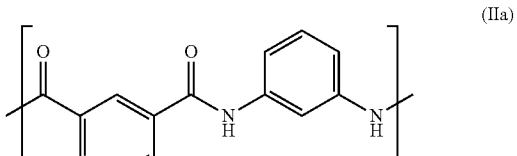
(IIa)

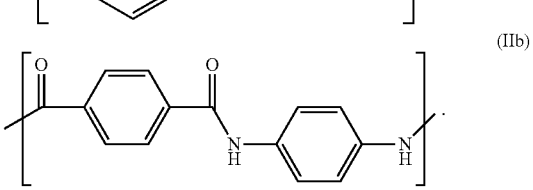
(IIb)

7. The process according to claim 1, wherein the non-crosslinked aramid polymer is in the form of a film, a membrane, an enamel, or a coating, and the heating step is carried out at a temperature comprised of from 150 to 280° C. for a period of time of from 1 minute to 15 minutes.

8. The process according to claim 1, wherein the non-crosslinked aramid polymer is in the form of a fiber or a filament, and the heating step is carried out at a temperature comprised of from 150 to 280° C. for a period of time of from 1 seconds to 15 seconds.

9. The process according to claim 1, which further comprises an additional step of heating the cross-linked aramid polymer comprising the repeating unit of formula (I) at a temperature comprised of from 240 to 420° C. for a period of time comprised of from 1 second to 15 minutes.

10. The process according to claim 9, wherein the temperature is comprised of from 300 to 400° C.

11. Cross-linked aramid polymer obtainable by the process as defined in claim 1.

12. Polymer made of the repeating unit of formula (I) as defined in claim 1.

13. Non-crosslinked polymer comprising a repeating unit of formula (I) as defined in claim 1.

14. Composite material comprising a cross-linked aramid polymer as defined in claim 11.

15. A method of using a cross-linked aramid polymer as defined in claim 11, the method comprising preparing a material comprising the cross-linked aramid polymer for phase separation or filtration; heat or electric insulation; or heat or impact protection.

16. The process according to claim 5, wherein the repeating unit of formula (I) is selected from the group consisting of a repeating unit of formula (Ia), (Ib), and (Ic):

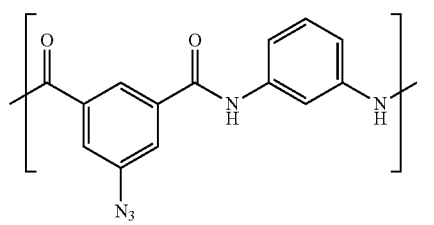
(Ia)

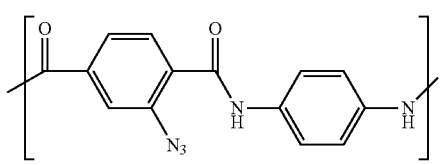
(Ib)

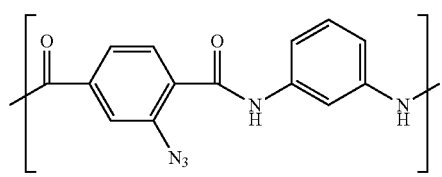
(Ic)

and wherein the repeating unit of formula (II) is selected from the group consisting of formula (IIa) and (IIb):

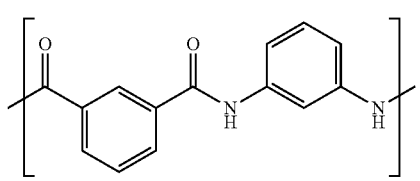
(IIa)

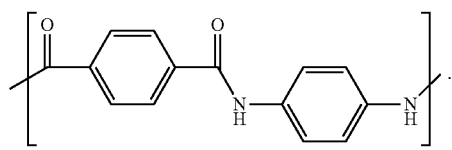
(IIb)

17. The process according to claim 3, which further comprises an additional step of heating the cross-linked aramid polymer comprising the repeating unit of formula (I) at a temperature comprised of from 240 to 420° C. for a period of time comprised of from 1 second to 15 minutes.

18. The process according to claim 17, wherein the temperature is comprised of from 300 to 400° C.

19. The process according to claim 4, which further comprises an additional step of heating the cross-linked aramid polymer comprising the repeating unit of formula (I) at a temperature comprised of from 240 to 420° C. for a period of time comprised of from 1 second to 15 minutes.

20. The process according to claim 19, wherein the temperature is comprised of from 300 to 400° C.

* * * * *

UNITED STATES PATENT AND TRADEMARK OFFICE
CERTIFICATE OF CORRECTION

PATENT NO. : 9,328,199 B2
APPLICATION NO. : 14/410017
DATED : May 3, 2016
INVENTOR(S) : José Miguel García Pérez et al.

It is certified that error appears in the above-identified patent and that said Letters Patent is hereby corrected as shown below:

On title page, in item (72), line 6, please delete the following:

"Pedro Antonio Tévez Bolívar"

and insert the following:

-- Pedro Antonio Estévez Bolívar --

Signed and Sealed this
Second Day of August, 2016

Michelle K. Lee
*Director of the United States Patent and Trademark Office*